US008659818B2

(12) United States Patent
Ueno et al.

(10) Patent No.: US 8,659,818 B2
(45) Date of Patent: Feb. 25, 2014

(54) OPTICAL-PATH-SWITCHING APPARATUS AND LIGHT SIGNAL OPTICAL-PATH-SWITCHING METHOD

(75) Inventors: Ichiro Ueno, Isehara (JP); Takashi Hiraga, Ikeda (JP); Noritaka Yamamoto, Ikeda (JP); Hirobumi Watanabe, Yokohama (JP); Shiro Futaki, Yokohama (JP); Noriyasu Shiga, Ichikawa (JP); Norio Tanaka, Tokyo (JP); Shigeru Takarada, Tokyo (JP)

(73) Assignees: National Institute of Advanced Industrial Science and Technology, Tokyo (JP); Inter Energy Co., Ltd., Kanagawa (JP); Dainichiseika Color & Chemical, Tokyo (JP)

( * ) Notice: Subject to any disclaimer, the term of this patent is extended or adjusted under 35 U.S.C. 154(b) by 0 days.

(21) Appl. No.: 13/637,582
(22) PCT Filed: Mar. 29, 2011
(86) PCT No.: PCT/JP2011/058486
§ 371 (c)(1),
(2), (4) Date: Oct. 24, 2012

(87) PCT Pub. No.: WO2011/122698
PCT Pub. Date: Oct. 6, 2011

(65) Prior Publication Data
US 2013/0057945 A1   Mar. 7, 2013

(30) Foreign Application Priority Data
Mar. 31, 2010  (JP) ................................ 2010-083747

(51) Int. Cl.
*G02F 1/29*  (2006.01)
*G02B 21/16*  (2006.01)
*G02F 1/01*  (2006.01)
*G02B 6/26*  (2006.01)

(52) U.S. Cl.
USPC .............. 359/299; 359/288; 359/388; 385/16

(58) Field of Classification Search
None
See application file for complete search history.

(56) References Cited

U.S. PATENT DOCUMENTS

2003/0118060 A1*  6/2003  Spuehler et al. ................ 372/18
(Continued)

FOREIGN PATENT DOCUMENTS

JP          B2-3809908         8/2006
(Continued)

OTHER PUBLICATIONS

Hiraga et al., "Development of an Optically gated Optical Switch using an Organic Dye—Applied to Local Telecommunication Technology," *Proc. Of SPIE*, vol. 6891, pp. 68910G-1-68910G-15, Jan. 1, 2008.

(Continued)

*Primary Examiner* — Thomas K Pham
*Assistant Examiner* — Brandi Thomas
(74) *Attorney, Agent, or Firm* — Oliff PLC

(57) ABSTRACT

An optical-path-switching apparatus according to the present invention includes a reducing optical system capable of guiding signal light and control light along the direction of gravity into a thermal-lens-forming optical element having an incidence plane positioned to be perpendicular to the direction of gravity in such a way as to differentiate respective convergence points in a direction perpendicular to the optical axis. The apparatus further includes a light-receiving unit configured to converge or condense straight-traveling signal light in the absence of irradiation with the control light and signal light whose optical path has been switched due to irradiation with the control light using the same optical element. Further, the apparatus includes a wedge-type prism provided at a passing position of the optical-path-switched signal light to increase the distance between the optical axis of the optical-path-changed signal light and the optical axis of the straight-traveling signal light.

7 Claims, 12 Drawing Sheets

(56) References Cited

U.S. PATENT DOCUMENTS

| | | | |
|---|---|---|---|
| 2004/0170109 A1* | 9/2004 | Asada et al. | 369/112.28 |
| 2005/0248844 A1 | 11/2005 | Ueno et al. | |
| 2007/0104417 A1 | 5/2007 | Tanaka et al. | |
| 2008/0069504 A1 | 3/2008 | Hiraga et al. | |
| 2009/0022453 A1 | 1/2009 | Ueno et al. | |
| 2010/0245960 A1* | 9/2010 | Ueno et al. | 359/210.1 |
| 2010/0265568 A1 | 10/2010 | Tanaka et al. | |

FOREIGN PATENT DOCUMENTS

| | | |
|---|---|---|
| JP | B2-3906926 | 4/2007 |
| JP | A-2007-225825 | 9/2007 |
| JP | A-2007-225827 | 9/2007 |
| JP | A-2008-225826 | 9/2007 |
| JP | A-2008-076685 | 4/2008 |
| JP | A-2008-083095 | 4/2008 |
| JP | A-2009-175164 | 8/2009 |

OTHER PUBLICATIONS

Written Opinion of the International Searching Authority issued in Application No. PCT/JP2011/058486; Dated Jul. 11, 2011.

International Search Report issued in Application No. PCT/JP2011/058486; Dated Jul. 11, 2011.

International Preliminary Report on Patentability issued in Application No. PCT/JP2011/058486; Dated Oct. 2, 2012.

* cited by examiner

OPTICAL-PATH-SWITCHING APPARATUS AND LIGHT SIGNAL OPTICAL-PATH-SWITCHING METHOD

TECHNICAL FIELD

The present invention relates to an optical-path-switching apparatus and a relevant light signal optical-path-switching method that can perform switching of the optical path using a thermal-lens-type optically-controlled optical-path-switching switch, which can be used in the field of optical electronics as well as in the field of photonics, such as optical communications and optical information processing.

BACKGROUND ART

The inventors of the present application have invented an optical-path-switching apparatus and a relevant method based on a new principle (see Patent Literature 1). The invented optical-path-switching apparatus is configured to irradiate a control-light-absorbing area of a thermal-lens-forming optical element with control light in a wavelength band that can be absorbed by the control-light-absorbing area and signal light in a wavelength band that cannot be absorbed by the control-light-absorbing area in such a manner that an optical axis of the control light coincides with an optical axis of the signal light when the control light and the signal light converge.

According to the above-described apparatus configuration, irradiation with the control light is selectively performed while the control-light-absorbing area of the thermal-lens-forming optical element is irradiated with the signal light. More specifically, in a case where irradiation with the control light and irradiation with the signal light are not performed simultaneously, the signal light passes through a hole of a mirror and travels straight.

On the other hand, if the irradiation with the control light and the irradiation with the signal light are performed simultaneously, the signal light is reflected by the hole-formed mirror that is inclined relative to the traveling direction of the signal light. In other words, the optical path of the signal light is changed by the mirror.

In this respect, Patent Literature 1 discloses an optically-controlled optical-path-switching apparatus that can switch the traveling direction of the signal light between two directions using the control light, which has only one type of wavelength. The optically-controlled optical-path-switching apparatus discussed in Patent Literature 1 is referred to as a "one-to-two type optically-controlled optical-path-switching apparatus" in the following description.

Further, the inventors of the present application have invented an optically-controlled optical-path-switching apparatus and a relevant light signal optical-path-switching method, in which a plurality of thermal-lens-forming optical elements are combined with hole-formed mirrors (see Patent Literature 2).

According to the invented optical-path-switching apparatus, a wavelength band that can be absorbed by a control-light-absorbing area and a wavelength of control light are in a one-to-one relationship. Further, the invented optical-path-switching apparatus uses a combination of a total of seven thermal-lens-forming optical elements, each having three types of control-light-absorbing areas; for example, there are used pigments that differ in absorption wavelength band.

In addition, the invented optical-path-switching apparatus realizes an optically-controlled switching system capable of distributing data of a server to eight destinations by ON-OFF controlling the control light having three types of wavelengths.

According to the above-described optical-path-switching apparatus discussed in Patent Literatures 1 and 2, a beam cross-sectional shape of the signal light is changed into a ring shape due to thermal lens effects obtained by the irradiation with the control light. Hence, the type of the above-described optical-path-switching is referred to as "ring beam type" in the following description.

Further, as disclosed in Patent Literatures 3 to 6, the inventors of the present application have further proposed other optical-path-changing methods and optical-path-switching apparatuses. According to the proposed optical-path-changing methods and the optical-path-switching apparatuses, emission of control light in a wavelength band that can be absorbed by the control-light-absorbing area and emission of signal light in a wavelength band that cannot be absorbed by the control-light-absorbing area are performed so as to let both the control light and the signal light enter the control-light-absorbing area of a thermal-lens-forming optical element and converge in the control-light-absorbing area. In this case, a light convergence point of the control light is differentiated from a light convergence point of the signal light.

Therefore, both the control light and the signal light converge on or near an incidence plane of the control-light-absorbing area in the light-traveling direction and then diffuse respectively. As a result, in the control-light-absorbing area, the temperature increases locally in the area where the control light is absorbed and its peripheral area. In response to the above-described increase in temperature, the structure of the thermal lens changes reversibly. The refractive index changes substantially, and the traveling direction of the signal light changes correspondingly.

According to the optical-path-changing mechanisms discussed in Patent Literatures 3 to 6, the signal light can retain a circular shape in beam cross section even in the case of irradiation with the control light. Hence, the above-described optical-path-changing mechanisms are referred to as "circular beam type."

Each of Patent Literatures 4 and 5 discloses a one-to-two type optically-controlled optical-path-switching apparatus that can switch the traveling direction of light between two directions using the control light having a single wavelength. Further, each of Patent Literatures 5 and 6 discloses an optically-controlled optical-path-switching apparatus that can switch the optical path of signal light emitted, for example, from a central fiber of a seven-core optical fiber bundle between seven directions using the control light emitted from one of peripheral optical fibers provided around the central fiber. The optically-controlled optical-path-switching apparatus discussed in Patent Literatures 5 and 6 is referred to as "one-to-seven-type optically-controlled optical-path-switching apparatus" in the following description.

Further, in the conventional circular-beam-type optically-controlled optical-path-switching apparatus, especially in the one-to-seven-type optically-controlled optical-path-switching apparatus, the thermal-lens-forming optical element is irradiated with the control light and the signal light in such a manner that the control light and the signal light converge at different positions in the control-light-absorbing area. In this respect, employing an end face closely-arranged multi-core optical fiber bundle disclosed in Patent literature 7 is preferable because the positioning of the optical axis of a signal light beam as well as the optical axes of a plurality of control light beams can be simplified and it is feasible to avoid the usage of a dichromatic mirror that may adversely influence the polarization dependence.

Further, Patent Literature 8 discloses a thermal-lens-forming optical element that is capable of enhancing thermal lens effects, in addition to an explanation with respect to the viscosity of a solvent contained in a pigment solution to be used for the thermal-lens-forming optical element together with temperature characteristics thereof. Further, the optically-controlled optical-path-switching apparatus discussed in Patent Literature 6 uses the seven-core optical fiber bundle that can detect the signal light when the signal light is switched between, for example, seven directions.

Patent Literature 1: JP 3809908 B
Patent Literature 2: JP 3906926 B
Patent Literature 3: JP 2007-225825 A
Patent Literature 4: JP 2007-225826 A
Patent Literature 5: JP 2007-225827 A
Patent Literature 6: JP 2008-083095 A
Patent Literature 7: JP 2008-076685 A
Patent Literature 8: JP 2009-175164 A

SUMMARY OF THE INVENTION

Technical Problem

When a method including a process of etching a clad of each single-mode optical fiber and bundling a plurality of optical fibers together is employed to fabricate the end face closely-arranged multi-core optical fiber bundle to be used for a conventional circular-beam-type optically-controlled optical-path-switching apparatus, it is not easy to set the distance between core centers of the assembled optical fibers (i.e., the diameter of an etching-processed clad) constituting the end face closely-arranged multi-core optical fiber bundle to be a short distance less than 40 μm, because of the necessity of assuring sufficient durability for each optical fiber.

As a result, in a case where the end face closely-arranged multi-core optical fiber bundle is used as an element for emitting the signal light and the control light, if a thermal lens area is formed in the thermal-lens-forming optical element when the control light is absorbed, the formed thermal lens area will be insufficient to change the optical path of a signal light beam. Usage efficiency of the control light power decreases. Further, the response of thermal lens effects is delayed.

Further, the interaction between the thermal lens area and the signal light beam is insufficient. The optical-path-changing angle cannot be increased. Therefore, signal beam detectors must be located within a shorter distance. However, when each detector is a fiber, it is not easy to reduce the distance between the detectors as described above.

Even if the distance between the detectors can be increased, the beam spot of each optical-path-changed signal light is excessively enlarged. As a result, the crosstalk between straight-traveling signal light and neighboring optical-path-changed signal light increases.

Further, as discussed in Patent literature 5, when an optical system composed of the same lenses is employed to simply condense the signal light into a detector when the signal light is emitted from the thermal lens in the absence of irradiation with the control light as well as in the presence of irradiation with the control light, the optical axis of the signal light does not become perpendicular to a fiber end face. Using the optical fiber decreases detection efficiency of the signal light.

In view of the above-described problems, an object of the present invention is to provide an optical-path-switching apparatus and a light signal optical-path-switching method, which can locate a signal light beam at a position adjacent to a thermal lens area formed when the control light is absorbed, and can lower the control light power to be required, improve the response in thermal lens effects, further increase the signal light detection efficiency, and reduce the crosstalk between a plurality of optical-path-switched signal lights as well as between each optical-path-switched signal light and the straight-traveling signal light.

Solution to Problem

To attain the above-described objects, the present invention provides an optical-path-switching apparatus and a relevant light signal optical-path-switching method.

An optical-path-switching apparatus according to the present invention, as defined in claim 1, includes:

a signal light source that can generate signal light having one or more types of wavelengths;

two or more control light sources that can generate control light having a specific wavelength different from that of the signal light;

a thermal-lens-forming optical element including a light-absorbing layer that can transmit the signal light and selectively absorb the control light; and a condensing unit that can guide the control light and the signal light to converge into the light-absorbing layer in such a way as to differentiate respective convergence points in a direction perpendicular to the optical axis, wherein the thermal-lens-forming optical element causes the control light and the signal light to converge into the light-absorbing layer and then diffuse in the traveling direction of the light in such a way as to transiently form a thermal lens due to a temperature increase locally occurring in an area where the control light is absorbed and its peripheral area in the light-absorbing layer, and the thermal lens generates a refractive index distribution in the light-absorbing layer that can change the traveling direction of the signal light so as to realize optical path switching, further, a first light-receiving unit and a second light-receiving unit are provided, so that straight signal light whose traveling direction has not been changed due to lack of irradiationed with the control light and signal light whose optical path has been switched due to irradiation with the control light are converged or condensed by the first light-receiving unit and the second light-receiving unit that are similar to each other, a wedge-type prism is provided between the first light-receiving unit and the second light-receiving unit, wherein the wedge-type prism refracts the straight signal light whose traveling direction has not been changed due to lack of irradiation with the control light and the signal light whose optical path has been switched due to irradiation with the control light while keeping a light separation state, and further at least one of the following conditions (1) to (5) is satisfied:

(1) a signal light incidence plane of the thermal-lens-forming optical element is set to be perpendicular to the direction of gravity, and the traveling directions of the signal light and the control light incident on the thermal-lens-forming optical element are set to be parallel to the direction of gravity, (2) the condensing unit causes the control light and the signal light to condense on the incidence plane of the light-absorbing layer in such a way as to differentiate respective convergence points in the direction perpendicular to the optical axis and constitute a reducing projection optical system, (3) the wedge-type prism has at least one wedge face provided at a portion corresponding to each passing position of the optical-path-switched signal light, (4) the wedge-type prism has at least one wedge face provided at a portion corresponding to each passing position of the optical-path-switched signal light so as to refract the optical-path-switched signal light in such a way as to reduce a distance between the optical axis of the optical-path-switched signal light and the optical axis of the straight signal light whose traveling direction has not been changed due to lack of irradiation with the control light, and (5) the thermal-lens-forming optical element is positioned in such a manner that, when the wedge-type prism is not provided, the straight-traveling signal light and the optical path switched signal light are converged or condensed to the same position by the first light-receiving unit and the second light-receiving unit.

The optical-path-switching apparatus according to the present invention, as defined in claim 2, in addition to having the features of the optical-path-switching apparatus defined in claim 1, is further characterized in that the signal light and the control light enter the thermal-lens-forming optical element via the incidence plane positioned on an upper side of the thermal-lens-forming optical element.

The optical-path-switching apparatus according to the present invention, as defined in claim 3, in addition to having the features of the optical-path-switching apparatus defined in claim 1 or claim 2, further includes an end face closely-arranged multi-core optical fiber bundle that can receive the straight signal light whose traveling direction has not been changed and the signal light whose optical path has been switched, which are converged or condensed by the first light-receiving unit and the second light-receiving unit.

The optical-path-switching apparatus according to the present invention, as defined in claim 4, in addition to having the features of the optical-path-switching apparatus defined in any one of claims 1 to 3, further includes:

an end face closely-arranged seven-core optical fiber bundle that includes a central optical fiber having a non-bundled terminal connected to the signal light source and six peripheral optical fibers having non-bundled terminal ends respectively connected to two to six control light sources each generating control light having a wavelength different from that of the signal light.

The optical-path-switching apparatus according to the present invention, as defined in claim 5, in addition to having the features of the optical-path-switching apparatus defined in any one of claims 1 to 4, is further characterized in that the wedge-shaped prism is a hexagonal truncated pyramid prism capable of causing the straight signal light whose traveling direction has not been changed due to lack of irradiation with the control light to pass through a top flat face of the hexagonal truncated pyramid prism while causing the signal light whose optical path has been switched to pass through any one of six wedge faces of the hexagonal truncated pyramid prism, thereby causing each light to exit from the hexagonal truncated pyramid prism.

The optical-path-switching apparatus according to the present invention, as defined in claim 6, in addition to having the features of the optical-path-switching apparatus defined in any one of claims 1 to 5, is further characterized in that the first light-receiving unit and the second light-receiving unit are spherical or non-spherical convex lenses having a focal length within a range of 1.0 mm to 3.0 mm.

A light signal optical-path-switching method according to the present invention, as defined in claim 7, includes causing a signal light source to generate signal light having one or more types of wavelengths;

causing two or more control light sources to generate control light having a specific wavelength different from that of the signal light;

guiding the control light and the signal light to converge into a light-absorbing layer of a thermal-lens-forming optical element capable of transmitting the signal light and selectively absorbing the control light in such a way as to differentiate respective convergence points in a direction perpendicular to the optical axis;

causing the signal light to transmit the thermal-lens-forming optical element;

causing the control light to be absorbed in the light-absorbing layer of the thermal-lens-forming optical element in such a way as to transiently form a thermal lens due to a temperature increase locally occurring in an area where the control light is absorbed and its peripheral area in the light-absorbing layer, and causing the thermal lens to generate a refractive index distribution in the light-absorbing layer to thereby change the traveling direction of the signal light so as to realize optical path switching;

causing a first light-receiving unit and a second light-receiving unit, which are constituted by the same optical element, to converge or condense straight signal light whose traveling direction has not been changed due to lack of irradiation with the control light and signal light whose optical path has been switched due to irradiation with the control light, and causing a wedge-type prism provided between the first light-receiving unit and the second light-receiving unit to refract the straight signal light whose traveling direction has not been changed due to lack of irradiation with the control light and the signal light whose optical path has been switched due to irradiation with the control light while keeping a light separation state, wherein at least one of the following conditions (6) to (10) is satisfied:

(6) a signal light incidence plane of the thermal-lens-forming optical element is set to be perpendicular to the direction of gravity, and the traveling directions of the signal light and the control light incident on the thermal-lens-forming optical element are set to be parallel to the direction of gravity, (7) the control light and the signal light are condensed on the incidence plane of the light-absorbing layer in such a way as to differentiate respective convergence points in the direction perpendicular to the optical axis and constitute a reducing projection optical system, (8) the wedge-type prism has at least one wedge face provided at a portion corresponding to each passing position of the optical-path-switched signal light, (9) the wedge-type prism has at least one wedge face provided at a portion corresponding to each passing position of the optical-path-switched signal light so as to refract the optical-path-switched signal light in such a way as to reduce a distance between the optical axis of the optical-path-switched signal light and the optical axis of the straight signal light whose traveling direction has not been changed due to lack of irradiation with the control light, and

(10) the thermal-lens-forming optical element is positioned in such a manner that, when the wedge-type prism is not provided, the straight-traveling signal light and the optical-path-switched signal light are converged or condensed to the same position.

Advantageous Effects of the Invention

The optical-path-switching apparatus and the light signal optical-path-switching method according to the present invention can bring the following effects.

First, the present invention can reduce control light power required to perform a signal light optical-path-switching operation to a lower level equal to or less than 40 mW.

Second, the present invention can realize a signal light optical-path-switching operation at a faster speed equal to or less than 10 milliseconds.

Third, the present invention can reduce the crosstalk between straight-traveling signal light and neighboring optical-path-switched signal light to a lower level equal to or less than −30 dB.

The fiber coupling efficiency can be improved because the optical-path-changed signal light can vertically enter an optical fiber.

The distance between two or more optical fibers each detecting incoming light can be appropriately set because the traveling direction of the optical-path-changed signal light can be changed by the wedge-shaped prism.

REFERENCES SIGNS LIST

1: thermal-lens-forming optical element, 2: solution cell, 3: pigment solution (light-absorbing layer), 4: thermal lens area, 5: collimator lens, 6: condensing lens, 7: light-receiving lens, 8: coupling lens, 9: hexagonal truncated pyramid prism, 10: straight-traveling signal light, 11 to 16: optical-path-changed signal light, 20: signal light, 21 to 26: control light, 100: emission-side end face closely-arranged seven-core optical fiber bundle, 101: emission-side end face of emission side end face closely-arranged seven-core optical fiber bundle 100, 200: central fiber end face of light-receiving-side seven-core optical fiber bundle, 201 to 206: peripheral fiber end face of light-receiving-side seven-core optical fiber bundle, 210: light-receiving-side seven-core optical fiber bundle, 90: top flat face of hexagonal truncated pyramid prism, 91 to 96: wedge face of hexagonal truncated pyramid prism, 97: bottom flat face of hexagonal truncated pyramid, 31: core, 32: clad, 33: adhesive, 34: ferrule, 27: control light, 52: collimator lens, 55: dichromatic mirror, 110: signal light source, 111: control light source, 220: straight-traveling signal-light-receiving optical fiber, 221: optical-path-changed signal-light-receiving optical fiber, 81: light intensity distribution of control light at or near convergence (condensing) point in thermal-lens-forming optical element, 82: light intensity distribution of control light at a position far from convergence (condensing) point in thermal-lens-forming optical element, 83: convergence (condensing) point of control light in thermal-lens-forming optical element, 84: apparent convergence (condensing) point of signal light in thermal-lens-forming optical element, 85: convergence (condensing) point of signal light in thermal-lens-forming optical element in the absence of irradiation with control light, 86: convergence (condensing) point in thermal-lens-forming optical element in the presence of irradiation with control light.

DESCRIPTION OF THE EMBODIMENTS

Hereinafter, preferred embodiments of the present invention are described below with reference to the attached drawings.

First Embodiment

An optical-path-switching apparatus and a relevant light signal optical-path-switching method according to a first embodiment of the present invention are described below with reference to FIGS. 1 to 3.

Figure 1:
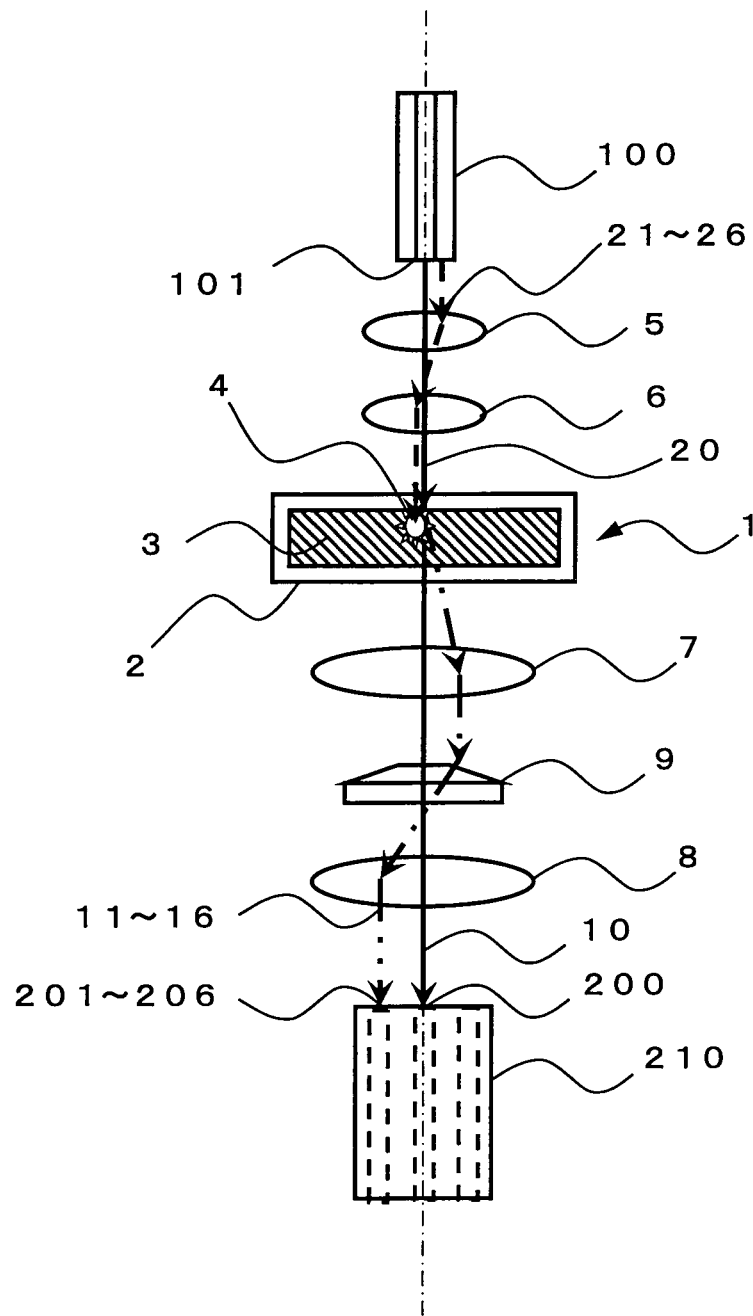
FIG. 1 schematically illustrates an optical-path-switching apparatus according to a first embodiment of the present invention.

FIG. 1 illustrates a schematic configuration of the optical-path-switching apparatus according to the first embodiment of the present invention. The optical-path-switching apparatus according to the first embodiment of the present invention, as schematically illustrated in FIG. 1, includes an emission-side end face closely-arranged seven-core optical fiber bundle 100, a collimator lens 5, a condensing lens 6, a thermal-lens-forming optical element 1, a light-receiving lens 7 serving as a first light-receiving unit, a coupling lens 8 serving as a second light-receiving unit, a hexagonal truncated pyramid prism 9 serving as a wedge-type prism, and a light-receiving-side seven-core optical fiber bundle 210.

Further, the optical-path-switching apparatus includes a substrate and a frame (not illustrated) that securely mount the above-described principal optical components.

For example, signal light emitted from a signal light source (not illustrated) having an oscillation wavelength of 1490 nm can be coupled with a central optical fiber of the emission-side end face closely-arranged seven-core optical fiber bundle 100 via an intervening space or an optical fiber.

Then, the signal light travels as signal light 20 from an end face 101 of the emission-side end face closely-arranged seven-core optical fiber bundle 100. The signal light 20 reaches the thermal-lens-forming optical element 1. In a case where no control light is irradiated, the signal light 20 travels as straight-traveling signal light 10 and then reaches a central optical fiber end face 200 of the light-receiving-side seven-core optical fiber bundle 210.

For example, the control light can be generated from each of two to six control light sources (not illustrated) having an oscillation wavelength of 980 nm. The generated control light can be coupled with any one of six peripheral optical fibers that constitute the emission-side end face closely-arranged seven-core optical fiber bundle 100 via an intervening space or an optical fiber. Then, the control light is output from the end face 101 of the emission-side end face closely-arranged seven-core optical fiber bundle 100.

The collimator lens 5 and the condensing lens 6 are two convex lenses sequentially disposed to condense the signal light and the control light emitted from the end face 101 onto the thermal-lens-forming optical element 1.

The above-described convex lenses can be replaced by a single convex lens if the lens is capable of forming an image with small aberration. If a center-to-center distance L between optical fiber cores of the emission-side end face closely-arranged seven-core optical fiber bundle 100 is 40 µm, a reducing optical system using two convex lenses (i.e., the collimator lens 5 and the condensing lens 6) is employed. The reason is as follows.

If the distance between the signal light and the control light in the thermal-lens-forming optical element 1 is not set to be equal to or less than 40 µm, a thermal lens area formed when the control light is absorbed cannot have sufficient influence on the optical path change of a signal light beam. The usage efficiency of control light power decreases. (If the control light power is constant, an optical-path-changing angle becomes smaller. The hexagonal truncated pyramid prism 9 cannot adequately separate the optical-path-changed signal light from the straight-traveling signal light).

For example, two convex lenses (i.e., the collimator lens 5 and the condensing lens 6) can be non-spherical lenses each having a focal length of 2 mm and a numerical aperture (NA) of 0.5. Appropriately adjusting the distance between the above-described optical components (i.e., the emission-side end face closely-arranged seven-core optical fiber bundle 100, the collimator lens 5, the condensing lens 6, and the thermal-lens-forming optical element 1) is useful to reduce the distance between respective optical axes from 40 µm to 35 µm, 30 µm, and 25 µm and enables the light to reach pigment solution (i.e., a light-absorbing layer) 3.

If the center-to-center distance L between the optical fiber cores of the emission-side end face closely-arranged seven-core optical fiber bundle 100 can be sufficiently reduced, employing the reducing optical system may not be required. Each of the collimator lens 5 and the condensing lens 6 is not limited to the non-spherical lens having a focal length of 2 mm and can be another lens.

The light-receiving lens 7 and the coupling lens 8 are non-spherical lenses that are identical to the collimator lens 5 and the condensing lens 6 in focal length (i.e., 2 mm) and numerical aperture (i.e., 0.5). However, the light-receiving lens 7 and the coupling lens 8 are not limited to the above-described non-spherical lenses. For example, each of the light-receiving lens 7 and the coupling lens 8 can be a convex lens having a focal length within a range of 2 mm to 8 mm. Further, the light-receiving lens 7 and the coupling lens 8 can differ from each other in focal length.

If the lens to be used has a longer focal length and the signal light has two wavelengths 1490 nm and 1310 nm, chromatic aberration has been generated. If the focal length is equal to or less than 2 mm, the influence by the chromatic aberration was not specifically recognized. Therefore, if the light-receiving lens 7 and the coupling lens 8 have a focal length of 8 mm, it is desired to employ achromatic lenses as the light-receiving lens 7 and the coupling lens 8.

Figure 3:
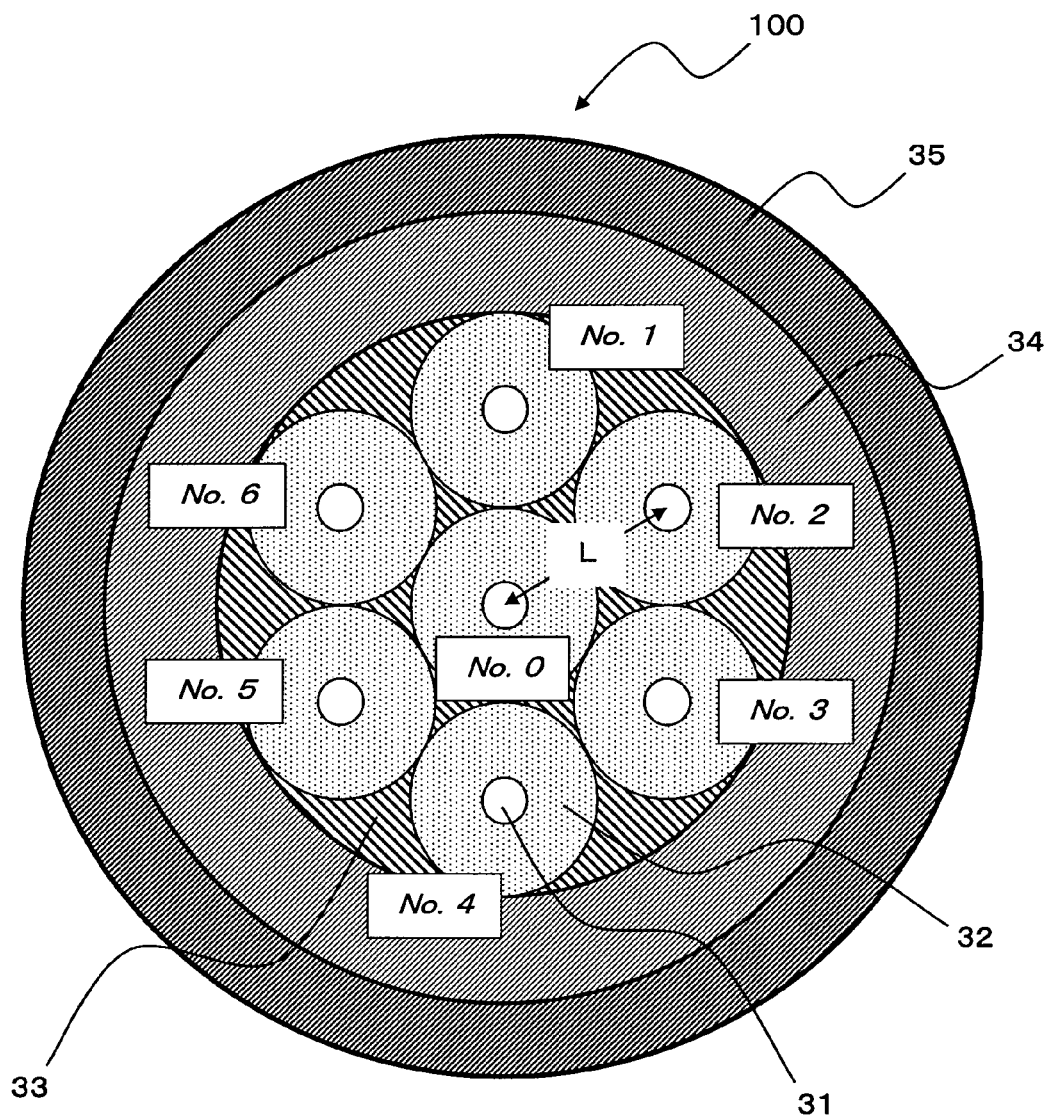
FIG. 3 is a cross-sectional view illustrating a schematic configuration of an end face closely-arranged multi-core optical fiber according to an embodiment of the present invention.

FIG. 3 is a cross-sectional view illustrating a schematic configuration of an end face closely-arranged multi-core optical fiber 100 that can be used in the present invention. The end face closely-arranged multi-core optical fiber 100 includes seven optical fibers. For example, each optical fiber can be manufactured by etching a single-mode fiber, which includes a core 31 having a diameter of 10 µm and a clad 32 having an outer diameter of 125 µm, with hydrogen fluoride, at a clad portion thereof, to have a clad outer diameter of 40 µm. The seven optical fibers are bundled together with an epoxy adhesive 33 and inserted into a bore of a ceramic-made ferrule 34. After the adhesive is hardened, the end face 101 is ground.

The seven optical fibers are not bundled at the other end thereof. A non-bundled terminal end of the central optical fiber of the end face closely-arranged multi-core optical fiber 100 is connected to the signal light source. Non-bundled terminal ends of six peripheral optical fibers are connected to respective control light sources. Hereinafter, the central optical fiber is referred to as "No. 0" optical fiber. The peripheral optical fibers are referred to as "No. 1" to "No. 6" optical fibers.

Figure 2:
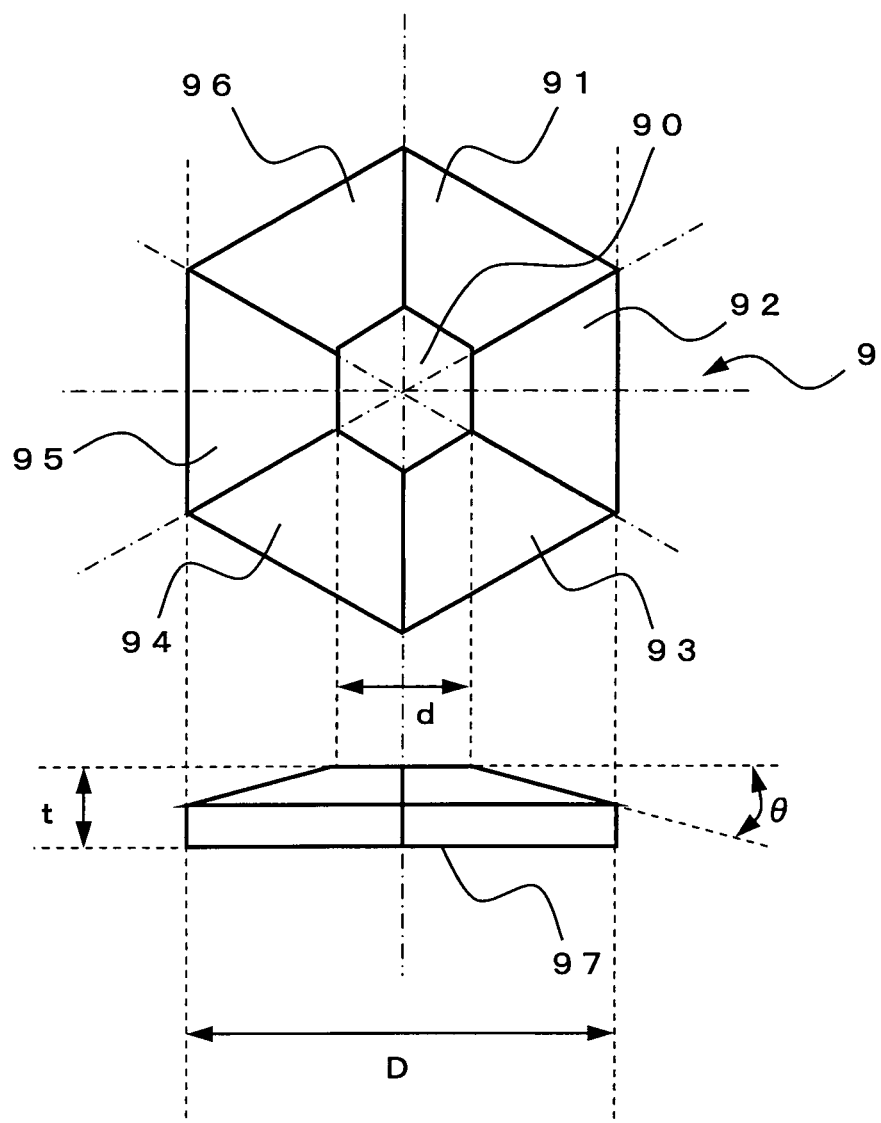
FIG. 2 schematically illustrates a hexagonal truncated pyramid prism that can be used for the optical-path-switching apparatus according to the first embodiment of the present invention.

FIG. 2 illustrates an example of the shape of the hexagonal truncated pyramid prism 9 to be located between the light-receiving lens 7 and the coupling lens 8. FIG. 2 includes a plan view positioned at an upper part thereof and a side view positioned at a lower part thereof.

For example, when the light-receiving lens 7 has a focal length of 2 mm, the hexagonal truncated pyramid prism 9 has the following dimensions. In FIG. 2, the length d of a top flat face 90 is 0.44 mm and the length D of a bottom flat face 97 is 8.6 mm. The thickness t of the hexagonal truncated pyramid prism 9 is 3.0 mm. The hexagonal truncated pyramid prism 9 is made of a glass member having a refractive index of approximately 1.5. A wedge angle $\theta$ is, for example, 7.1 degrees or 14.0 degrees.

The reason why the length d of the top flat face 90 is set to be 0.44 mm is because the straight-traveling signal light 10 can surely pass through the top flat face 90 when the control light passing through the thermal lens is not irradiated.

For example, the diameter of a light flux becomes approximately 0.4 mm if the focal length of the light-receiving lens 7 and the coupling lens 8 is 2 mm, the coupling magnification is 1, and the NA of the emission-side end face closely-arranged seven-core optical fiber bundle 100 is 0.1. However, the actual length d is set to be a slightly larger value (0.44 mm) in consideration of a Gaussian distribution of the laser beam.

As the reducing optical system using two convex lenses of the collimator lens 5 and the condensing lens 6 is employed, the light-receiving lens 7 and the coupling lens 8 cooperatively constitute an enlarging optical system capable of enhancing the signal light coupling efficiency of respective optical fibers that constitute the light-receiving-side seven-core optical fiber bundle 210.

Therefore, the straight-traveling signal light and the optical-path-changed signal light are not perfectly parallel when these lights are emitted from the light-receiving lens 7. An actual value of the length d may slightly differ from 0.4 mm. However, because of smallness in enlargement rate, these lights can be approximated as parallel light. Further, when the distance between the light-receiving lens 7 and the hexagonal truncated pyramid prism 9 is minimized, the length d is not required to be greatly changed. If the focal length of the light-receiving lens 7 and the coupling lens 8 is changed, the length d of the top flat face 90 must be changed. The length d is proportional to the focal length of lenses to be used.

The hexagonal truncated pyramid prism 9 can change the traveling direction of the signal light again after the traveling direction has been once changed by the thermal-lens-forming optical element 1. The hexagonal truncated pyramid prism 9 can enlarge the distance Dx (which represents the distance between a beam spot center of the straight-traveling signal light and a beam spot center of the optical-path-changed signal light) at the position of the light-receiving-side seven-core optical fiber bundle.

If the inclined angle of the wedge is θ as illustrated in FIG. 2, when the refractive index is approximately 1.5, light having passed through the wedge travels toward a thicker side of the wedge at an inclined angle of approximately θ/2 relative to the traveling direction of light in a case where no wedge is inserted.

For example, when θ=7.1 (degrees), the focal length of the light-receiving lens 7 and the coupling lens 8 is 2 mm, and the coupling magnification is 1, the distance Dx is approximately 125 μm (Dx≈2000*2π*7.1/2/360). The distance Dx is proportional to the focal length of the lenses to be used. Further, the distance Dx is proportional to the inclined angle θ of the wedge. The distance Dx can be increased, for example, to 250 μm or 300 μm by appropriately setting a combination of the above-described numerical values.

In the following description, the seven-core optical fiber bundle is a mere example of a light-receiving side detector. If the distance between the beam spot center of the straight-traveling signal light and the beam spot center of the optical-path-changed signal light at a detection position is large; e.g., when the distance Dx is equal to or greater than 400 μm, employment of the seven-core optical fiber bundle may not be desired. In this case, it is useful to use seven single-mode optical fibers respectively positioned and bonded in such a way as to optimize detection of corresponding signal light.

For example, if the distance between the beam spot center of the straight-traveling signal light and the beam spot center of the optical-path-changed signal light at the detection position is 425 μm, it is useful to remove the clad of the optical fiber and insert the central optical fiber in a nickel fixing tube, which has an inner diameter of 150 μm to 180 μm and an outer diameter of 300 μm, and then bond six peripheral optical fibers around the nickel tube.

If the distance between the beam spot center of the straight-traveling signal light and the beam spot center of the optical-path-changed signal light at the detection position is greater than the above-described value, it is useful to increase the outer diameter of the nickel tube.

(Component Technique S1) Magnitude of Thermal Lens Effects:

(S1-1) power density of control light (power of control light, condensing conditions, loss in optical system, and boiling point of solvent of pigment solution)

(S1-2) performance of the thermal-lens-forming optical element 1 (concentration and absorbance of pigment, viscosity and temperature characteristics of pigment solution, liquid film thickness of pigment solution, position of control light condensing point, shape of solution cell, etc.)

(S1-3) positional relationship between a signal light optical axis and a control light optical axis and the distance between optical axes at an incidence position on the light-absorbing layer (pigment solution) of the thermal-lens-forming optical element 1.

(S1-4) relationship between setup orientation and direction of gravity of the thermal-lens-forming optical element 1 and relationship between incidence direction and direction of gravity of signal light and control light relative to the thermal-lens-forming optical element 1

(Component Technique S2) Design of an Optical System Capable of Guiding Signal Light and Control Light into the Thermal-Lens-Forming Optical Element 1:

(S2-1) employment of a reducing projection optical system (S2-2) convergence position of signal light and control light on the light-absorbing layer in the thickness direction (Component Technique S3) Design of a Light-Receiving Optical System Capable of Receiving the Straight-Traveling Signal Light 10 and Optical-Path-Changed Signal Lights 11 to 16 emitted From the Thermal-Lens-Forming Optical Element 1:

(S3-1) focal length selection and combination for the light-receiving lens 7 and the coupling lens 8

(S3-2) setting of angle θ of the wedge portion of the hexagonal truncated pyramid prism 9

(S3-3) component-to-component distance between the light-receiving lens 7, the hexagonal truncated pyramid prism 9, the coupling lens 8, and the end face of the light-receiving-side seven-core optical fiber bundle 210

(Component Technique S4) Response Speed

Hereinafter, the above-described constraints in design components and operation conditions are described below with reference to a preferred embodiment.

[Component Technique S1] Optimization of Thermal Lens Effects:

The thermal-lens-forming optical element 1 includes a coin-type solution cell 2 that is filled with a pigment solution 3. The solution cell 2 is, for example, composed of two quartz discs and a quartz spacer. Each of the quartz discs and the quartz spacer has a thickness of 500 μm. The diameter of the solution cell 2 is within a range of 8 mm to 10 mm.

For example, a method for manufacturing the thermal-lens-forming optical element 1 includes dissolving an organic pigment, which has a maximum absorption wavelength within a range of 950 nm to 1050 nm and does not absorb light in the wavelength band of signal light (e.g., a range of 1310 nm to 1600 nm) in an organic solvent having a boiling point within a range of 290° C. to 300° C.

The method further includes filling the solution cell 2 with the pigment solution 3, whose concentration has been adjusted beforehand to realize an absorbance equal to or greater than 5.0 in a case where the liquid thickness is 500 μm and the wavelength of the light is 980 nm, and then hermetically closing an injection hole with the epoxy adhesive. Needless to say, the pigment solution 3 serves as a pigment absorption layer.

A dye obtainable in the market as an infrared ray absorption pigment to be used in an infrared ray device using a YAG laser as a light source is preferably used as the above-described organic pigment. To attain the above-described optical concentration when the liquid thickness is 500 μm, it is desired to set the pigment concentration of the solution within a range of 0.1 weight % to 0.5 weight %, although the optimum value is variable depending on the tinting strength of the pigment.

Any other organic pigment can be used regardless of its chemical structure if it has the above-described solubility and light absorption characteristics and does not decompose in a solution state (i.e., in a state where it is dissolved in the following solvent) even when it is irradiated with a laser having an absorption wavelength band for a long time and further even when the temperature instantaneously increases up to 300° C.

It is generally known that irradiation with light deteriorates a pigment in the following manner. A triplet oxygen molecule in a ground state in the air receives energy of light absorbed by the pigment and becomes an active and excited singlet oxygen molecule that oxidizes the pigment. To prevent the above-described chemical reaction, it is useful to perform purification processing beforehand to remove dissolved oxygen molecules remaining in the pigment solution 3, so that the solution cell 2 is filled with the purified pigment solution 3.

Further, it is recommendable to use a mixed solvent containing the following four structural isomer components (identical in molecular weight) as the above-described organic solvent.

First component: 1-phenyl-1-(2,5-xylyl)ethane
Second component: 1-phenyl 1-(2,4-xylyl)ethane
Third component: 1-phenyl 1-(3,4-xylyl)ethane
Fourth component: 1-phenyl 1-(4-ethylphenyl)ethane The mixed solvent containing the above-described four structural isomer components is preferably used for the thermal-lens-forming optical element 1, because the viscosity of this solvent and temperature dependence of the viscosity are extremely small compared to other organic solvents having a boiling point of approximately 300° C. However, the above-described mixed solvent is disadvantageous in that it tends to be oxidized by oxygen molecules in the air. As described above, this problem can be solved by performing purification processing beforehand to remove dissolved oxygen molecules, so that the solution cell 2 is filled with the purified pigment solution 3.

The upper limit of the control light power is variable depending on the boiling point of the pigment solution using the above-described solvent. More specifically, if the control light power increases, transmission of the signal light is prevented by generation of bubbles when the maximum temperature of a thermal-lens-forming area reaches the boiling point of the solvent.

Further, micro bubbles may generate before the temperature reaches the boiling point and scatter the signal light beam in such a way as to increase the beam diameter. Hence, to most effectively use the thermal lens effects of the thermal-lens-forming optical element 1, it is desired to set the upper limit of the control light power to be 5% to 10% lower than the boiling initiation level, before the control light enters the thermal-lens-forming optical element 1.

Further, the control light output may oscillate due to a temperature change of the control light source. When a variation width of the oscillating output is taken into consideration, the control light output may reach the boiling initiation level due to variation of the output if the control light power is only 5% lower than the boiling initiation level.

Therefore, to most effectively use the thermal lens effects of the thermal-lens-forming optical element 1, it is desired to set the upper limit of the control light power to be 8% to 10% lower than the boiling initiation level, before the control light enters the thermal-lens-forming optical element 1.

A desired value of the control light power is variable depending on design conditions of a condensing optical system configured to converge the control light and the signal light into the thermal-lens-forming optical element 1, which is, for example, the reducing optical system composed of the lenses 5 and 6 illustrated in FIG. 1.

For example, in a case where the light is received by the light-receiving-side seven-core optical fiber bundle 210, if the lenses 5 and 6 are non-spherical convex lenses having a focal length of 2 mm and the beam convergence is strictly performed in such a way as to approach a diffraction limit, the control light power is set in a range of approximately 20 mW to 50 mW as an absolute value.

If the control light power exceeds 50 mW, the pigment solution may start boiling. Switching of the signal light between seven directions is feasible while preventing the boiling of the pigment solution, in the best condition described in the present embodiment, when the coupling efficiency relative to the light-receiving-side optical fiber is equal to or greater than 60% and the crosstalk between neighboring channels is equal to or less than −30 dB. Basically, the power of the control light to be input to the thermal-lens-forming optical element 1 is not influenced by the focal length of the lenses 5 and 6.

To reduce the loss of the control light and the signal light due to reflections on the surfaces of optical components, it is recommendable to apply an anti-reflection coating on the surfaces of the optical components to be used (i.e., the lens, the thermal-lens-forming optical element, the hexagonal truncated pyramid prism, etc.) as well as the end faces of the emission-side end face closely-arranged seven-core optical fiber bundle and the light-receiving-side seven-core optical fiber bundle. An appropriate conventionally-known element can be used as an anti-reflection coating material.

Regarding the positional relationship and the distance between the optical axis of the signal light and the optical axis of the control light at the incidence position on the light-absorbing layer (pigment solution) of the thermal-lens-forming optical element 1, it is desirable to guide the control light and the signal light to converge into the light-absorbing layer in such a way as to differentiate the convergence point of the control light from the convergence point of the signal light in a direction vertical to the optical axis.

For example, it is feasible to maximize the thermal lens effects by the usage of the reducing optical system that can reduce the distance (e.g., 40 μm) between the optical axis of the signal light and the optical axis of the control light on the output side of the emission-side end face closely-arranged seven-core optical fiber bundle to a short distance within a range of 20 μm to 25 μm at the incidence position on the light-absorbing layer (pigment solution) of the thermal-lens-forming optical element 1.

If the distance between the optical axes is shorter than 20 μm, the incidence efficiency of the optical-path-changed signal light into the light-receiving-side optical fiber decreases due to collapse of the beam cross-sectional shape.

Figure 6:
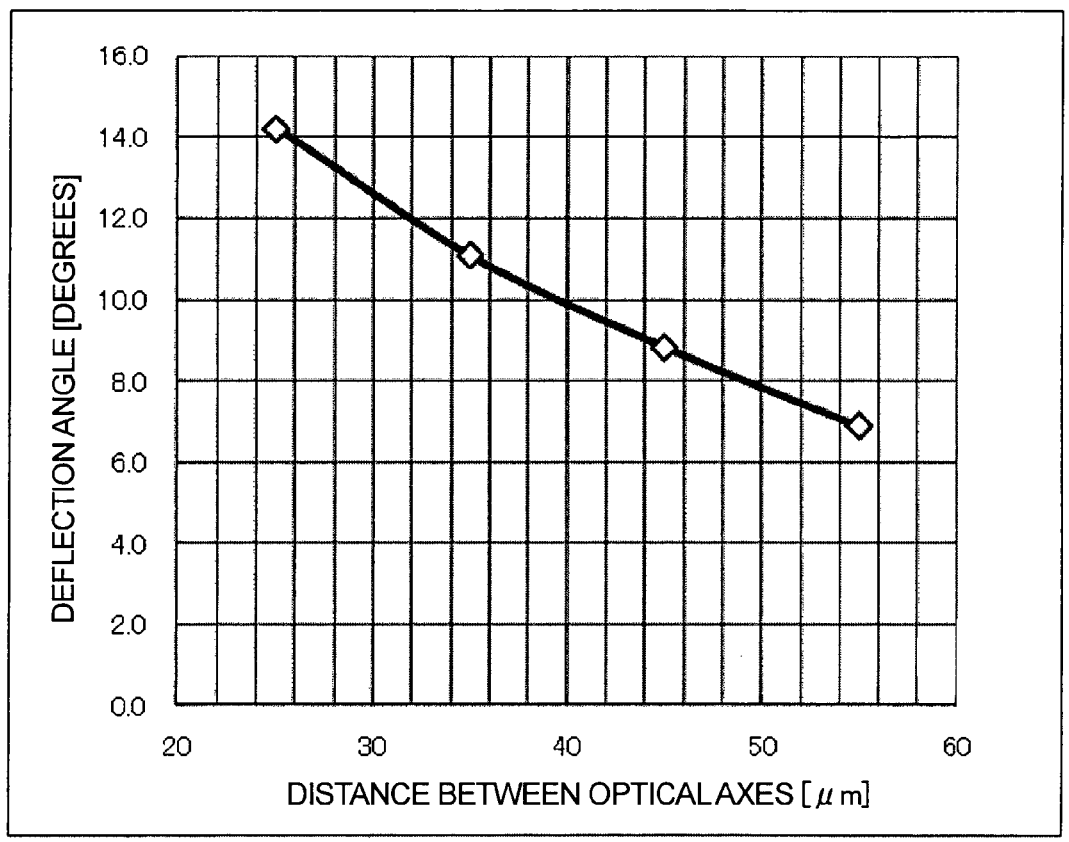
FIG. 6 is a graph illustrating a relationship between the distance between optical axes (i.e., the distance between the signal light and the control light at a condensing point in a direction perpendicular to the optical axis) in relation to a corresponding optical path change amount (i.e., an optical-path-changing angle) in a light-absorbing layer.

FIG. 6 illustrates examples of the distance between the optical axes (i.e., the distance between the signal light and the control light at the condensing point in the direction perpendicular to the optical axis) in relation to a corresponding optical path change amount (i.e., the optical-path-changing angle) in the light-absorbing layer. If the distance between the optical axes becomes shorter, the optical-path-changing angle becomes larger. If the optical-path-changing angle becomes larger, the straight-traveling signal light and the optical-path-changed signal light can be efficiently separated and the crosstalk of a detected signal (information) can be reduced.

The light-absorbing layer (pigment solution) of the thermal-lens-forming optical element 1 forms a thermal lens at a region where the control light has been absorbed, according to a sequential phenomenon of "temperature increase→thermal expansion→density reduction=refractive index reduction." A low-density portion moves upward (i.e., the direction opposite to gravity) due to heat convection occurring in a fluid.

Accordingly, to stabilize the shape of the thermal lens area and maximize the thermal lens effects, it is useful to perform the following setting in determining the setup orientation of the thermal-lens-forming optical element 1 relative to the direction of gravity and also in determining the directions of the signal light and the control light incident on the thermal-lens-forming optical element 1 relative to the direction of gravity.

More specifically, the signal light incidence plane of the thermal-lens-forming optical element 1 is set to be perpendicular to the direction of gravity. Further, the traveling directions of the signal light and the control light incident on the thermal-lens-forming optical element are set to be parallel to the direction of gravity.

Setting the apparatus and the operation method as described above is effective in preventing the thermal lens area formed in the light-absorbing layer (pigment solution) of the thermal-lens-forming optical element 1 from being subjected to the convection. Therefore, the thermal lens area can be stably held at the same position in the solution cell. Thus, the control light power can be extremely effectively used to enhance the thermal lens effects.

Further, even when the irradiation position of a plurality of control lights is differentiated relative to the signal light beam, the shape of a thermal lens to be formed and the influence given to the signal light can be rendered uniform.

It is presumed that the following comparative embodiments are employable as setting examples of the apparatus and the operation method to be compared with the present embodiment.

First, as described below in the comparative embodiment 1, the signal light incidence plane of the thermal-lens-forming optical element can be set to be parallel to the direction of gravity and the traveling directions of the signal light and the control light incident on the thermal-lens-forming optical element can be set to be perpendicular to the direction of gravity.

Second, as described below in the comparative embodiment 2, the signal light incidence plane of the thermal-lens-forming optical element 1 can be set to be perpendicular to the direction of gravity and the traveling directions of the signal light and the control light incident on the thermal-lens-forming optical element 1 can be set to be opposite to the direction of gravity.

In any case, the usage efficiency of the thermal lens effects deteriorates as compared with the present embodiment. Further, as an undesirable phenomenon, the changing degree of the optical path may vary depending on the irradiation position of the control light, or the beam position of the optical-path-changed signal light may move in response to a temporal variation of the thermal lens effects.

[Component Technique S2] Design Optimization for the Optical System Configured to Guide the Signal Light and the Control Light into the Thermal-Lens-Forming Optical Element 1:

As described above, the distance between the optical axis of the signal light emitted from the central optical fiber of the emission-side end face closely-arranged seven-core optical fiber bundle 100 and the optical axis of the control light emitted from the peripheral optical fiber is set to, for example, 40 μm. In this case, the thermal lens effects can be maximized by the reducing projection optical system composed of the collimator lens 5 and the condensing lens 6 in the following manner.

More specifically, the reducing projection optical system guides the control light and the signal light to converge into the light-absorbing layer (pigment solution) of the thermal-lens-forming optical element 1 in such a way as to differentiate respective convergence points in a direction perpendicular to the optical axis. The distance between the optical axis of the signal light and the optical axis of the control light can be reduced to a short distance within a range of 20 μm to 30 μm.

In this case, it is desired to appropriately combine two convex lenses having the same focal length as the collimator lens 5 and the condensing lens 6. For example, two non-spherical convex lenses each having a focal length of 2 mm and a numerical aperture (NA) of 0.5 can be combined and employed as the collimator lens 5 and the condensing lens 6 that constitute the reducing optical system.

Figure 5A:
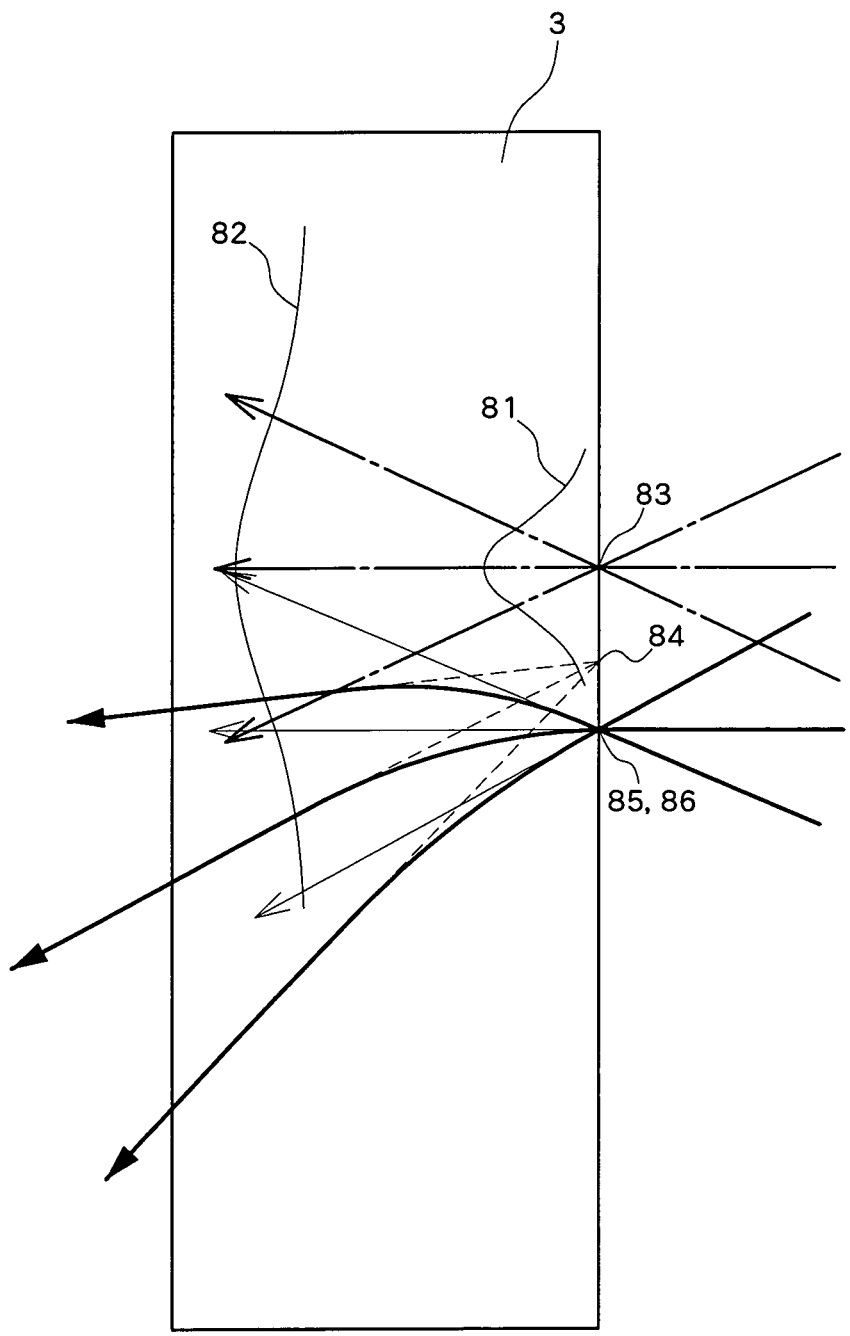
FIG. 5A illustrates an optical-path-changing state of signal light according to the present invention, in which the optical path of the signal light is changed due to irradiation with the control light.
Figure 5B:
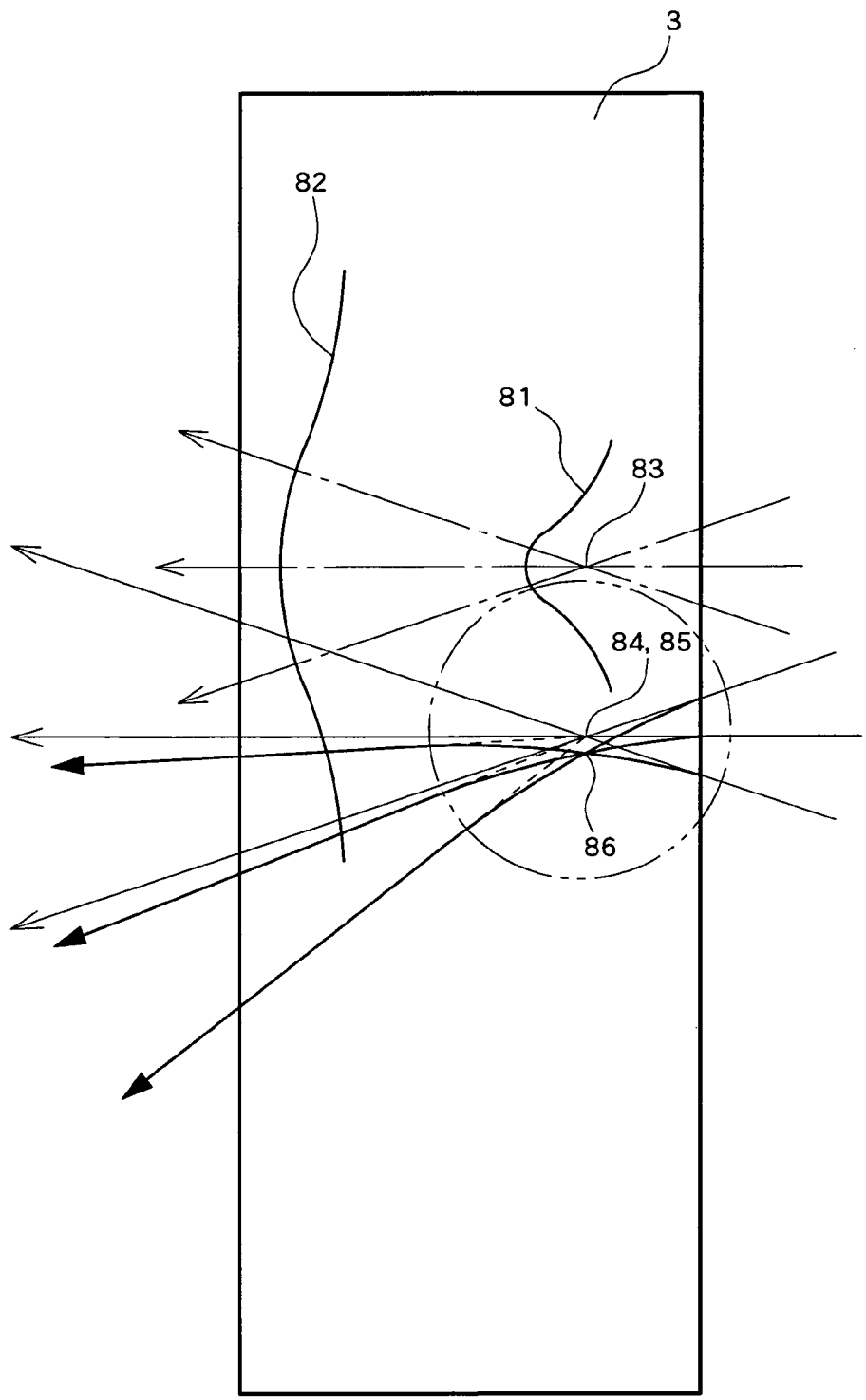
FIG. 5B illustrates an optical-path-changing state of signal light according to the present invention, in which the optical path of the signal light is changed due to irradiation with the control light.
Figure 5C:
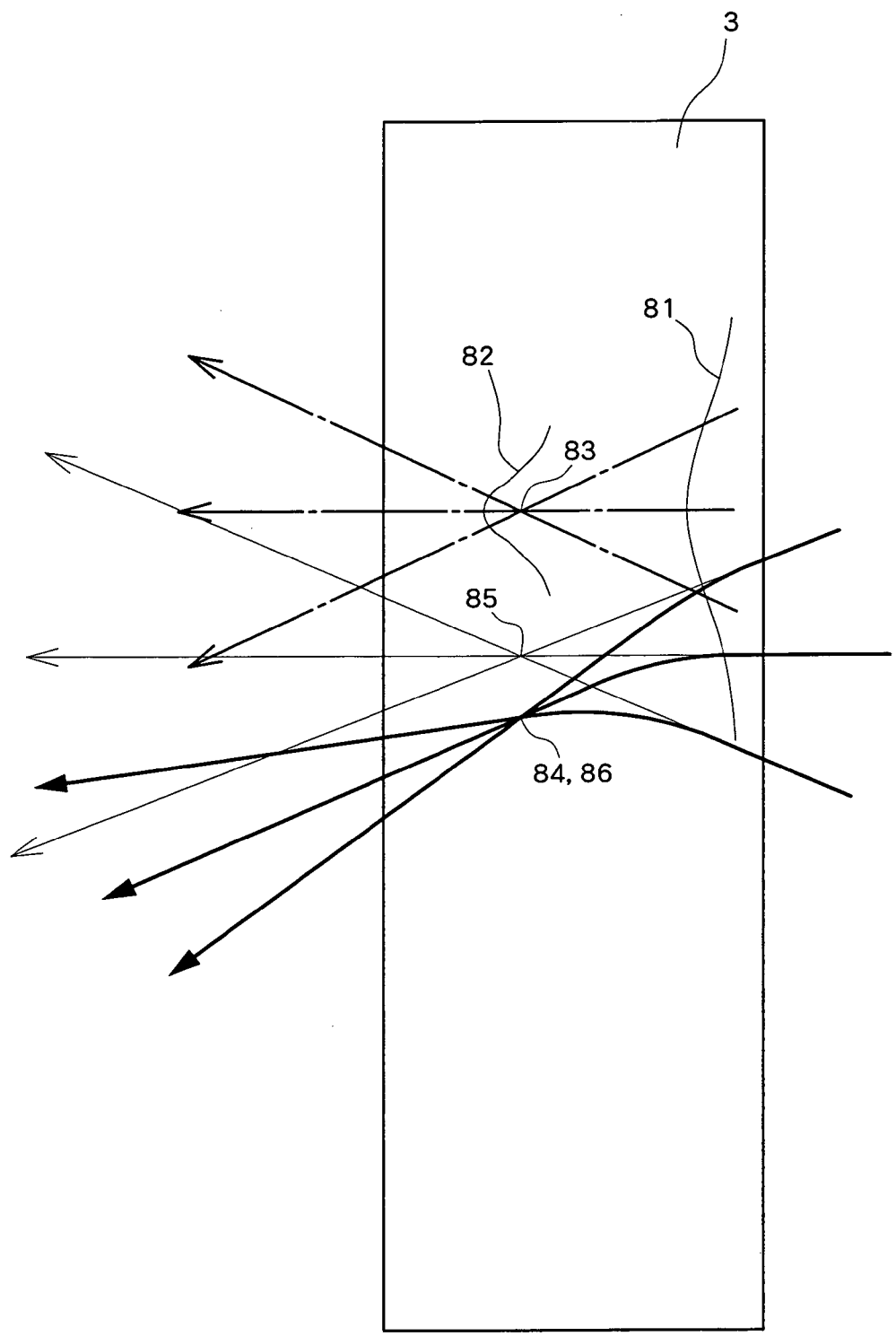
FIG. 5C illustrates an optical-path-changing state of signal light according to the present invention, in which the optical path of the signal light is changed due to irradiation with the control light.
Figure 5D:
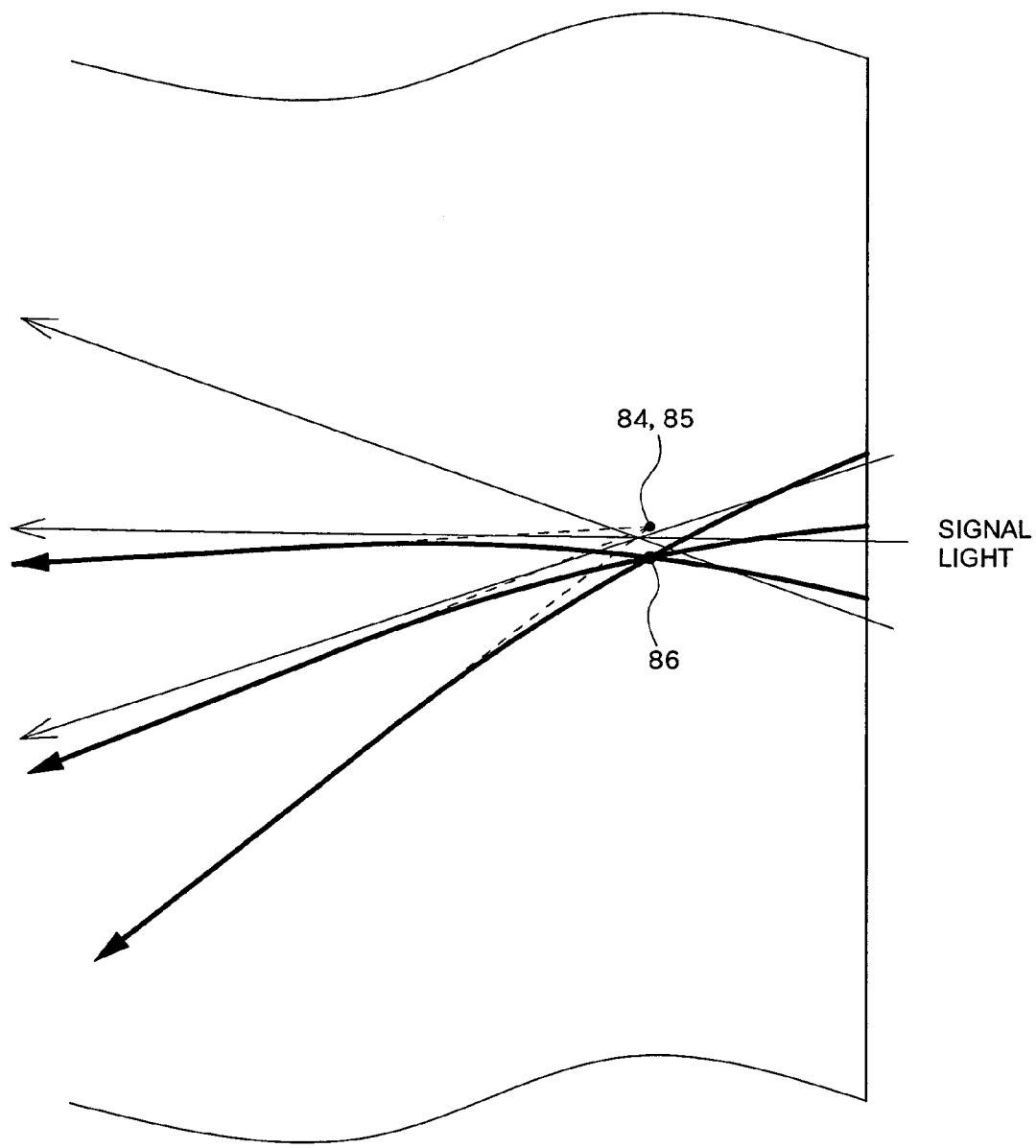
FIG. 5D is an enlarged view illustrating a portion encircled by a line having alternating long and two short dashes in FIG. 5B.

The shape of the optical-path-switched signal light is variable depending on the convergence position of the signal light and the control light in the thickness direction of the light-absorbing layer. FIGS. 5A, 5B, and 5C illustrate examples of an optical-path-changed state of the signal light due to irradiation with the control light. Further, FIG. 5D is an enlarged view illustrating a portion encircled by a line having alternating long and two short dashes in FIG. 5B. To simplify the following description, the refraction of light is not taken into consideration in FIGS. 5A, 5B, and 5C, although the refraction of light occurs if the refractive index of the light-absorbing layer 3 is different from the refractive index of the solution cell 2 surrounding the light-absorbing layer.

FIGS. 5A, 5B, and 5C illustrate a light intensity distribution 81 of the control light at or near the convergence (condensing) point and a light intensity distribution 82 of the control light at a position far from the convergence (condensing) point, in the light-absorbing layer 3 of the thermal-lens-forming optical element 1. FIGS. 5A, 5B, and 5C further illustrate a convergence (condensing) point 83 of the control light, a convergence (condensing) point 85 of the signal light in the absence of irradiation with the control light, a convergence (condensing) point 86 of the signal light in the presence of irradiation with the control light, and an apparent convergence (condensing) point 84 of the signal light.

As a schematic illustration of the optical path of the laser beam, FIG. 5A illustrates convergence (condensing) of the control light and the signal light on the incidence plane of the light-absorbing layer 3. FIG. 5B illustrates convergence (condensing) of the control light and the signal light at a point positioned inward (several tens of micrometers) relative to the incidence plane of the light-absorbing layer 3. FIG. 5C illustrates convergence (condensing) of the control light and the signal light at a further inner position far from the incidence plane of the light-absorbing layer 3.

In the absence of irradiation with the control light, the signal light travels straight. In the presence of irradiation with the control light, the signal light changes its optical path. The signal light having passed through the light-absorbing layer 3 converges (condenses) on detectors 201 to 206 illustrated in FIG. 1, as if the signal light is emitted from the apparent convergence (condensing) point 84 of the signal light in the light-absorbing layer 3 illustrated in FIG. 5A to 5D.

As illustrated in FIG. 5A, the convergence (condensing) point 85 of the signal light in the absence of irradiation with the control light coincides with the convergence (condensing) point 86 of the signal light in the presence of irradiation with the control light. The apparent convergence (condensing) point 84 of the signal light is spaced from the convergence (condensing) point 85 (or 86).

The signal light is converged (condensed) into the thermal-lens-forming optical element. Although not illustrated in the drawings, the signal light bends greatly at a portion positioned closely to the control light and is greatly influenced by the control light. On the other hand, the signal light does not bend so greatly at a portion spaced far from the control light.

According to the example illustrated in FIG. 5A, the beam diameter is smallest on the incidence plane and gradually increases with increasing distance from the incidence plane. Therefore, according to the example illustrated in FIG. 5A, the signal light is constantly and greatly influenced by the control light at the same portion positioned closely to the control light. Accordingly, in this case, the beam cross-sectional shape of the converged (condensed) signal light becomes a crescent, not a circle.

In the example illustrated in FIG. 5B, the positional relationship between the control light and the signal light is not different from that illustrated in FIG. 5A. However, the position of the light-absorbing layer 3 is slightly offset toward the incidence side of the control light and the signal light. Therefore, the control light and the signal light converge (condense) at the point positioned inward relative to the light-absorbing layer 3. In this case, the convergence (condensing) point 85 of the signal light in the absence of irradiation with the control light can be set to substantially coincide with the apparent convergence (condensing) point 84 of the signal light.

As apparent from the enlarged view illustrated in FIG. 5D, the convergence (condensing) point 84 coincides with the convergence (condensing) point 85. The convergence (condensing) point 86 is slightly spaced from the convergence (condensing) point 84 (or 85). According to the example illustrated in FIG. 5B, influence of the control light can be rendered uniform, because the portion of the signal light positioned closely to the control light is switched at the convergence (condensing) point 86. Therefore, it is believed that the beam cross-sectional shape of the converged (condensed) signal light becomes a circle without causing any distortion.

In the example illustrated in FIG. 5C, the control light and the signal light converge (condense) at the further inner far from the incidence plane of the light-absorbing layer 3. The apparent convergence (condensing) point 84 of the signal light substantially coincides with the convergence (condensing) point 86 of the signal light in the presence of irradiation with the control light.

The control light is absorbed by the thermal-lens-forming optical element 1 when the control light travels in the thermal-lens-forming optical element 1. Therefore, the quantity of light gradually decreases and the thermal lens effects cannot be obtained at the inner position spaced (e.g., 200 μm to 300 μm) from the incidence plane.

According to the example illustrated in FIG. 5C, the signal light condenses at the position where the signal light is not substantially influenced by the control light. Therefore, the signal light does not bend after passing through the convergence (condensing) point 86. However, the signal light bends largely before the signal light reaches the convergence (condensing) point 86, because the signal light is greatly influenced by the control light at a portion opposite the portion illustrated in FIG. 5A. Therefore, it is believed that the beam cross-sectional shape of the signal light does not become a circle.

In the present embodiment, a positional adjustment for the thermal-lens-forming optical element 1; i.e., the light-absorbing layer 3, is performed to keep the beam cross section of the optical path changed signal light as a circular beam, as illustrated in FIG. 5B. In this case, if the hexagonal truncated pyramid prism is not provided, the straight signal light whose traveling direction has not been changed due to lack of irradiation with the control light and the signal light whose optical path has been changed due to irradiation with the control light converge (condense) to the same point at a light-receiving position of the detector.

More specifically, if the optical path switching is performed keeping a circular beam cross-sectional shape of the signal light to improve the coupling efficiency, the convergence (condensing) point 85 of the signal light in the absence of irradiation with the control light coincides with the apparent convergence (condensing) point 84 of the signal light. In other words, the positional relationship between two convergence (condensing) points 85 and 84 is "fixed." Therefore, it is difficult to separately detect the straight-traveling signal light and the optical-path-changed signal light.

Hence, as a novel and unique apparatus configuration, it is useful to provide the hexagonal truncated pyramid prism 9 between the light-receiving lens 7 and the coupling lens 8. The hexagonal truncated pyramid prism 9 enables the straight-traveling signal light to travel straight without causing any bending. On the other hand, the hexagonal truncated pyramid prism 9 causes the optical-path-changed signal light to travel at an inclined angle relative to the straight-traveling signal light.

Therefore, the straight-traveling signal light and the optical-path-changed signal light can be received and detected, with higher coupling efficiency, using different optical fibers located at sufficiently spaced positions.

As a result, the crosstalk of the straight-traveling signal light and the optical-path-changed signal light can be greatly reduced. For example, if the arrangement illustrated in FIG. 5A is employed, the beam positions of the straight-traveling signal light and the optical path switched light can be greatly changed without using the wedge prism. However, the beam cross-sectional shape of the optical-path-changed signal light greatly deviates from a circular beam having the Gaussian distribution. Therefore, the coupling efficiency greatly decreases when the signal light is received and detected by the optical fiber. Further, the signal light itself greatly attenuates and cannot be practically used.

[Component Technique S3] Design Optimization for a Light-Receiving Optical System Configured to Receive the Straight-Traveling Signal Light 10 and the Optical-Path-Changed Signal Lights 11 to 16 emitted From the Thermal-Lens-Forming Optical Element 1:

The first design setting factor includes a setting of the light-receiving lens 7 (first light-receiving unit) that receives the straight-traveling signal light (i.e., signal light in the absence of irradiation with the control light) 10 and the optical-path-changed signal light (i.e., signal light in the presence of irradiation with control lights 21 to 26) 11 to 16 emitted from the thermal-lens-forming optical element 1. The first design setting factor further includes a setting of the coupling lens 8 (the second light-receiving unit) that couples the straight-traveling signal light 10 and the optical-path-changed signal lights 11 to 16 to the core of the fiber end face of the light-receiving-side seven-core optical fiber bundle 210.

The wavelength of the signal light is 1490 nm to be used as a downlink signal and 1310 nm to be used as an uplink signal according to the Fiber To The Home (FTTH), which are influenced by the refractive index wavelength dependency of lenses. If the optical system is optimized for one wavelength in the absence of achromatic lenses, the optical fiber coupling efficiency decreases at the other wavelength.

Table 1 illustrates experimentally obtained optical fiber coupling efficiency measured at three focal lengths of 8 mm, 2.75 mm, and 2.0 mm under the condition that the light-receiving lens 7 and the coupling lens 8 have the same focal length. As apparent from the table 1, when the focal length is equal to or less than 2.75 mm, the wavelength dependence of the optical fiber coupling efficiency becomes extremely smaller.

In the case of the lens having a focal length of 8 mm, if the optical system adjustment is performed with 1550 nm light, the optical fiber coupling efficiency measured with 1310 nm light is smaller than the coupling efficiency measured with 1550 nm light. Similarly, if the optical system adjustment is performed with 1310 nm light, the optical fiber coupling efficiency measured with 1550 nm light is smaller than the coupling efficiency measured with 1310 nm light.

The minimum focal length of the light-receiving lens 7 and the coupling lens 8 is practically 1.0 mm. If the focal length is set to a smaller value, the lens 7 or 8 may collide against the hexagonal truncated pyramid prism 9 when the lens moves. In short, when the light-receiving lens 7 (the first light-receiving unit) and the light-receiving lens 8 (the second light-receiving unit) are spherical or non-spherical convex lenses having a focal length of 1.0 mm to 3.0 mm, there is not any influence by the wavelength difference of the signal light even when achromatic lenses are not used.

when condensed by the light-receiving lens 7 and the coupling lens 8 so that the light-receiving-side seven-core optical fiber bundle can efficiently detect the signal light. For example, if the signal light is reduced by the collimator lens 5 and the condensing lens 6 at a reduction rate of 0.8, it is desired to enlarge the signal light by the light-receiving lens 7 and the coupling lens 8 at an enlargement rate of 1.25.

In Table 1, the coupling efficiency is relatively small when the focal length of the lens is 8 mm, because it is difficult to optimize the enlargement rate by the light-receiving lens 7 and the coupling lens 8.

The distance between the coupling lens 8 and the hexagonal truncated pyramid prism 9 is required to enable the signal light, whose optical path has been switched due to irradiation with the control light, having passed through the hexagonal truncated pyramid prism 9 to pass through a point near an incidence-side focal point of the coupling lens 8 so that the signal light can vertically reach the end face of respective single-mode optical fibers serving as detectors 200 to 206.

Therefore, the distance between the light-receiving lens 7 and the coupling lens 8 cannot be set to an extremely small value. For example, it is desired to set the distance between the light-receiving lens 7 and the coupling lens 8 in a range from 10 mm to 25 mm when the focal length of the light-receiving lens 7 and the coupling lens 8 is 2 mm, the wedge angle of the hexagonal truncated pyramid prism 9 is 7.1 degrees, and the reduction rate by the collimator lens 5 and the condensing lens 6 is 0.8.

The second design setting factor includes the wedge to be inserted between the light-receiving lens 7 and the coupling lens 8. When the seven-core optical fiber bundle is employed, it is desired to integrate six pieces of wedges to be required as the hexagonal truncated pyramid prism 9 illustrated in FIG. 2. In this case, the straight-traveling signal light 10 enters the hexagonal truncated pyramid prism 9 from the top flat face 90 and exits from the bottom surface 97. On the other hand, the optical-path-changed signal lights 11 to 16 pass through wedge faces 91 to 96 positioned around the top flat face 90 and are refracted in such a way as to increase the distance between the optical axis of the straight-traveling signal light and the optical axis of the optical-path-changed signal light.

The second design setting factor further includes a setting for preventing the beam spot of the optical-path-changed

TABLE 1

| OPTICAL SYSTEM ADJUSTMENT WAVELENGTH AND SIGNAL LIGHT WAVELENGTH | OPTICAL FIBER COUPLING EFFICIENCY [%] | | | | | |
|---|---|---|---|---|---|---|
| | f = 2 mm | | f = 2.75 mm | | f = 8 mm | |
| | STRAIGHT LIGHT | CHANGED LIGHT | STRAIGHT LIGHT | CHANGED LIGHT | STRAIGHT LIGHT | CHANGED LIGHT |
| 1550 nm adjusted 1550 nm light | 57.2 | 46.2 | 47.8 | 46.5 | 23.6 | 22.5 |
| 1310 nm adjusted 1550 nm light | 52.1 | 43.4 | 47.1 | 37.8 | 15.7 | 6.0 |
| 1550 nm adjusted 1310 nm light | 54.7 | 50.6 | 60.6 | 36.1 | 12.1 | 5.3 |
| 1310 nm adjusted 1310 nm light | 57.8 | 52.8 | 61.1 | 56.1 | 28.0 | 28.7 |

The signal light passing through the thermal-lens-forming optical element 1 is condensed to the light-receiving-side seven-core optical fiber bundle by the light-receiving lens 7 and the coupling lens 8. As the reducing optical system is composed of two convex lenses of the collimator lens 5 and the condensing lens 6, it is desired to enlarge the signal light signal light from overlapping with the beam spot of the straight-traveling signal light at an image-forming position. The above-described setting is effective to reduce the crosstalk between the straight-traveling signal light and the optical-path-changed signal light as well as the crosstalk between the neighboring optical-path-changed signal lights.

As described above, the reducing optical system is composed of two convex lenses of the collimator lens 5 and the condensing lens 6. It is desired to enlarge the signal light when condensed by the light-receiving lens 7 and the coupling lens 8 so that the light-receiving-side seven-core optical fiber bundle can efficiently detect the signal light.

For example, if the signal light is reduced by the collimator lens 5 and the condensing lens 6 at a reduction rate of 0.8, it is desired to enlarge the signal light by the light-receiving lens 7 and the coupling lens 8 at an enlargement rate of 1.25. If the light-receiving lens 7 and the coupling lens 8 have a focal length of 2 mm and the distance between the light-receiving lens 7 and the coupling lens 8 is set to 20 mm so as to realize 1.25 times enlargement of the signal light, approximately 0.3 degrees of condensing of light occurs when the light has passed through the light-receiving lens 7. Therefore, when the distance Dx is set equal to 125 μm, the wedge angle θ must be set to ≈6.5 degrees, which is reduced by an amount of 0.3 degrees. Alternatively, if the wedge angle is θ=7.1 degrees, the distance Dx must be set to a small value (approximately 115 μm).

If the signal light deviates from the parallel light due to increase of the enlargement rate, aberration of the signal light occurs when the signal light passes through the wedge portion of the hexagonal truncated pyramid prism 9. However, if the focal length of the light-receiving lens 7 and the focal length of the coupling lens 8 are changed so as to realize the enlargement, the signal light can remain as parallel light and can pass through the hexagonal truncated pyramid prism 9 without causing any aberration. For example, to realize the enlargement of the light at the enlargement rate of 1.25, it is desired to set the focal length of the light-receiving lens 7 to 1.6 mm and to set the focal length of the coupling lens 8 to 2 mm.

When the thermal-lens-forming optical element 1 is not irradiated with the control light, the signal light travels straight and reaches the top flat face portion. Namely, the signal light travels straight without changing its optical path. Further, the hexagonal truncated pyramid prism 9 is set in such a manner that the optical-path-changed signal light having passed through the wedge portion of the hexagonal truncated pyramid prism 9 travels in a direction intersecting with the straight-traveling signal light in the absence of irradiation with the control light. As illustrated in FIG. 1, the distance between the hexagonal truncated pyramid prism 9 and the coupling lens 8 is set in such a manner that the signal light having passed through the hexagonal truncated pyramid prism 9 can vertically reach the end face of respective single-mode optical fibers (light-receiving-side seven-core optical fibers 200 to 206), after passing through the coupling lens 8.

To enable the light to vertically enter the light-receiving-side seven-core optical fibers, it is desired that the signal light whose optical path has been changed by the wedge can pass through the incidence side focal point of the coupling lens 8. When the signal light can vertically enter the optical fiber from the end face thereof, the incidence efficiency of the signal light can be maximized at the detector (optical fiber). The single-mode optical fibers (the detectors 200 to 206) are set to be substantially parallel to the optical axis.

The prism may be configured to have a shape different from the above-described hexagonal truncated pyramid shape. For example, the prism may be a flat glass member recessed at the center thereof so as to have a reversed hexagonal truncated pyramid shape. In this case, it is feasible to increase the distance Dx between beam spot centers of the straight-traveling signal light and the optical-path-changed signal light at the position of the light-receiving-side seven-core optical fiber bundle. However, it is difficult to enable the signal light to vertically enter the end face of respective single-mode optical fibers (light-receiving-side seven-core optical fibers 200 to 206).

According to the hexagonal truncated pyramid prism 9 illustrated in FIG. 1, the top flat face serves as an incidence plane and the bottom flat face serves as an emission plane. However, the hexagonal truncated pyramid prism 9 can be placed upside down so that the top flat face can serve as an emission plane and the bottom flat face can serve as an incidence plane.

The third design setting factor includes a setting of the wedge (wedge) angle θ of the hexagonal truncated pyramid prism 9 and a determination of the distance between the centers of the peripheral fibers constituting the light-receiving-side seven-core optical fiber bundle.

The distance Rout between the optical axis of the straight-traveling signal light and the optical axis of the optical-path-changed signal light at the position of the detector can be calculated based on the inclined angle θ of the hexagonal truncated pyramid prism 9 and the focal length f of the coupling lens 8 in the following manner.

[Numerical Expression 1]

$$R{\rm out} = f * \tan(\omega_{out}) \quad (1)$$

In Formula (1), $\omega_{out}$ represents an emission angle of the light from the hexagonal truncated pyramid prism 9 (i.e., an angle relative to a line perpendicular to the top flat face of the hexagonal truncated pyramid prism 9, which takes a positive value when it crosses the vertical line). The emission angle $\omega_{out}$ can be given in the following manner.

[Numerical Expression 2]

$$\omega_{out} \approx 2*(n_1/n_0 - 1)*(\theta/2) + \omega_{in} \quad (2)$$

In Formula (2), $n_1$ represents a refractive index of the hexagonal truncated pyramid prism 9, $n_0$ represents a refractive index of a medium (e.g., the air in the present embodiment) that surrounds the hexagonal truncated pyramid prism 9, and θ represents an inclined angle of the hexagonal truncated pyramid prism 9. Further, $\omega_{in}$ represents an incident angle of the light entering the hexagonal truncated pyramid prism 9 (i.e., an angle relative to a line perpendicular to the top flat face of the hexagonal truncated pyramid prism 9, which takes a positive value when it crosses the vertical line and takes a negative value when it departs from the vertical line).

When the focal length of the coupling lens 8 is 2 mm, the inclined angle θ of the hexagonal truncated pyramid prism 9 is 7.1 degrees, $n_1 = 1.5$, $n_0 = 1.0$, and the straight-traveling signal light is approximately parallel to the optical-path-changed signal light ($\omega_{in} = 0$), the distance Rout between the optical axes of the straight-traveling signal light and the optical-path-changed signal light at the position of the detector is 125 μm.

The signal light having passed through the hexagonal truncated pyramid prism 9 enters and passes through the coupling lens 8, and then vertically enters the single-mode optical fiber (i.e., the detector) from the end face thereof. In this case, the distance X between the coupling lens 8 and the hexagonal truncated pyramid prism 9 can be calculated in the following manner.

When $r_1$ represents the distance from the optical axis at an incident position on the hexagonal truncated pyramid prism 9, an incident position $r_2$ on the coupling lens 8 can be given in the following manner.

[Numerical Expression 3]

$$r_2 \approx r_1 - \tan(\theta/2)*X \quad (3)$$

When $r_3$ represents the distance from optical axis at the convergence (condensing) point of the signal light having passed through the coupling lens 8, the distance $r_3$ can be calculated based on the focal length f of the coupling lens 8 in the following manner.

[Numerical Expression 4]

$$r_3 = -f*\tan(\theta/2) \quad (4)$$

When the detector is positioned at the distance $r_3$ from the optical axis, and if the incidence efficiency of the light entering the optical fiber is taken into consideration, the following relationship can be satisfied.

[Numerical Expression 5]

$$r_2 = r_3$$

From Formulae (3) and (4),

[Numerical Expression 6]

$$-f*\tan(\theta/2) \approx r_1 - \tan(\theta/2)*X$$

$$\therefore X = f + r_1/\tan(\theta/2) \quad (5)$$

More specifically, the distance X between the coupling lens 8 and the hexagonal truncated pyramid prism 9, which can maximize the incidence efficiency of the light entering the optical fiber (i.e., detector), can be obtained as a sum of the focal length f of the coupling lens 8 that converges (condenses) the light into the optical fiber (i.e., the detector) and a value obtained by diving the distance $r_1$ of the incidence light on the hexagonal truncated pyramid prism 9 from the optical axis by a tangential value of the inclined angle of the hexagonal truncated pyramid prism 9. For example, when the focal length of the coupling lens 8 is 2 mm and the inclined angle $\theta$ of the hexagonal truncated pyramid prism 9 is 7.1 degrees, the distance X between the coupling lens 8 and the hexagonal truncated pyramid prism 9 is approximately 9 mm.

The above-described calculation is based on the assumption that the single-mode optical fibers (i.e., the detectors 200 to 206) are set to be substantially parallel to the optical axis. If the single-mode optical fibers (i.e., the detectors 200 to 206) are not parallel to the optical axis, the inclination of the optical axis must be corrected.

Figure 8:
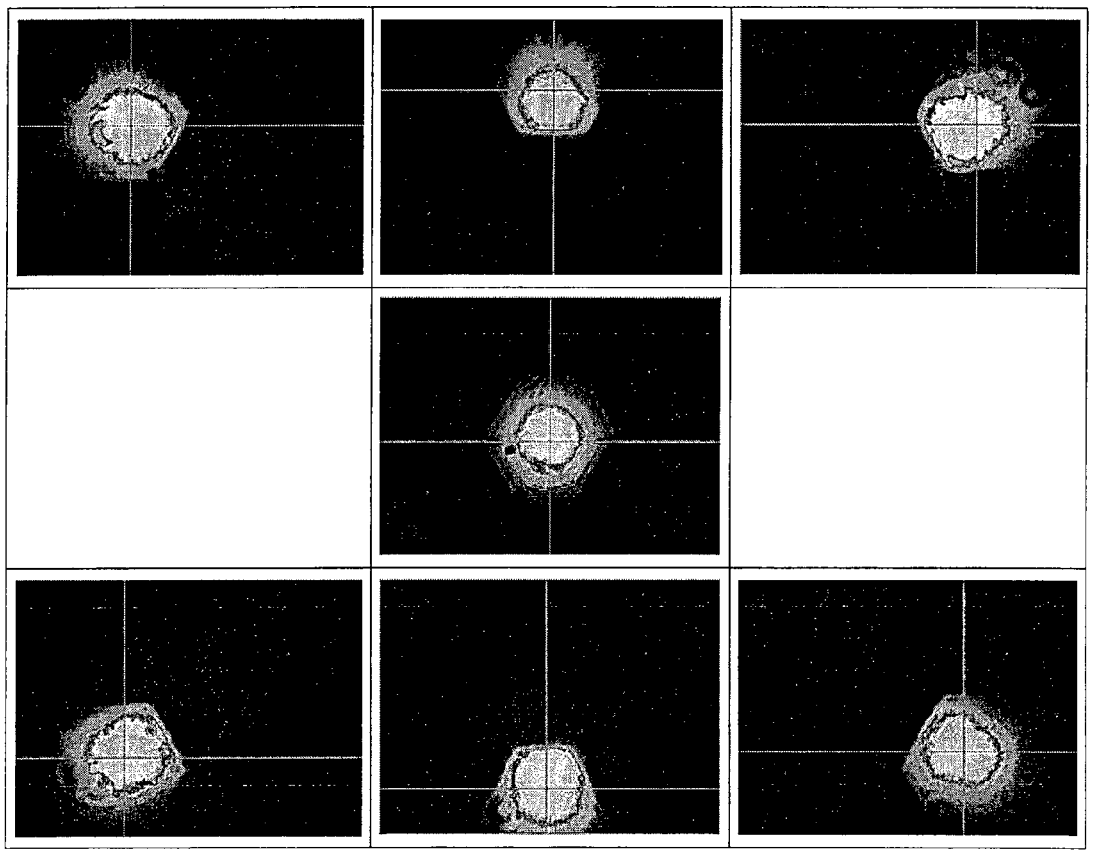
FIG. 8 is a view illustrating cross sections of a straight-traveling signal light beam and optical-path-switched signal light beams, in the optical-path-switching apparatus according to the first embodiment of the present invention, which can be observed when the control light and the signal light are incident on the light-absorbing layer of the thermal-lens-forming optical element while maintaining a distance of 25 μm between optical axes thereof, and the straight-traveling signal light beam and the optical-path-switched signal light beams emitted from the thermal-lens-forming optical element enter the light-receiving plane of the beam profiler.

FIG. 8 illustrates beam cross sections of the straight-traveling signal light and the optical-path-switched signal lights, which can be observed when the following conditions are satisfied. The distance between the optical axis of the control light and the optical axis of the signal light is 25 μm. The signal light first enters the light-absorbing layer of the thermal-lens-forming optical element 1. Then, after passing through the thermal-lens-forming optical element 1, a straight-traveling signal light beam and optical-path-switched signal light beams reach and pass through the hexagonal truncated pyramid prism having a wedge angle of 7 degrees. Finally, the signal light reaches a light-receiving surface of a beam profiler. As apparent from FIG. 8, it is understood that the optical path switching between seven directions can be realized without deforming a circular shape of each beam.

Figure 9:
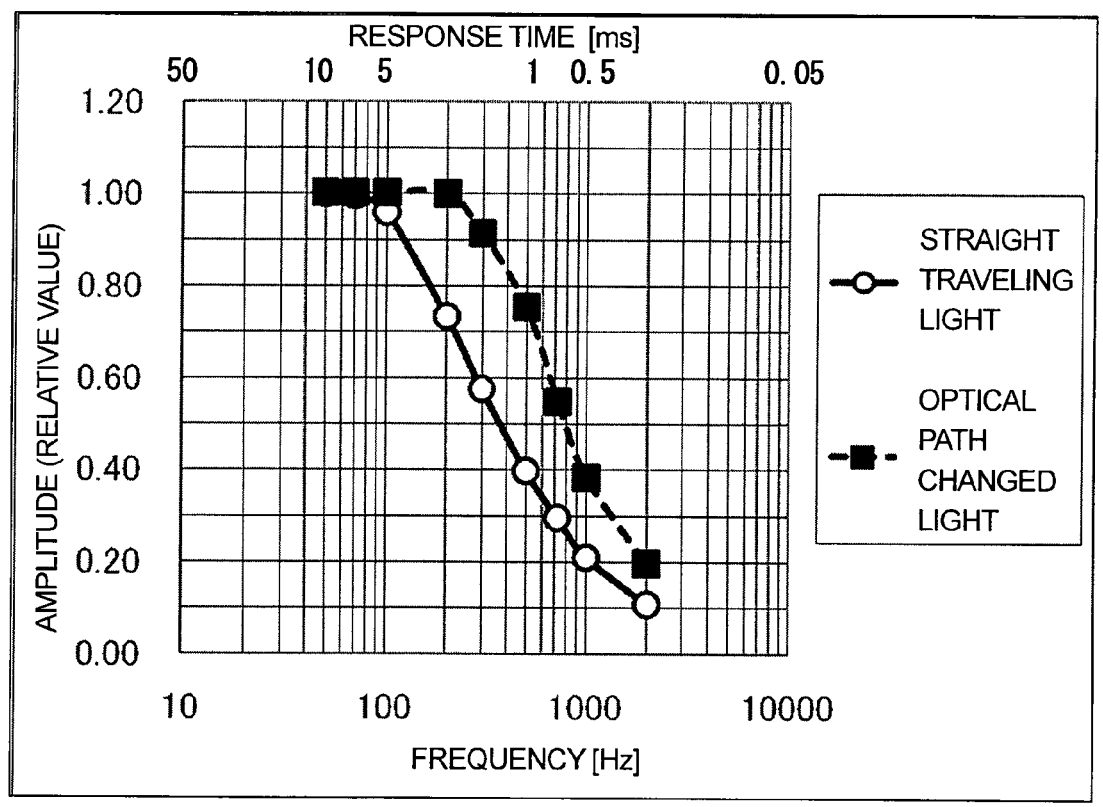
FIG. 9 is a graph plotting a value (hereinafter, referred to as "amplitude") obtained in a best state of the present embodiment, in which any one of control lights 21 to 26 (e.g., control light 21) intermittently turns on and off at a duty ratio 1:1 and the frequency is changed within a range of 50 Hz to 2000 Hz, as a ratio of the intensity of the straight-traveling signal light and the optical-path-changed signal light in the above-described state to the intensity of the signal light in a reference state where the control light is continuously turned on or off.

[Component Technique S4] Optical Path Switching Speed:

In the best state of the present embodiment, any one of the control lights 21 to 26 (e.g., the control light 21) intermittently turns on and off at a duty ratio 1:1. In this case, the frequency is changed within a range of 50 Hz to 2000 Hz. FIG. 9 is a graph plotting a value (hereinafter, referred to as "amplitude") obtained as a ratio of the intensity of the straight-traveling signal light and the optical-path-changed signal light in the above-described state to the intensity of the signal light in a reference state where the control light is continuously turned on or off.

For example, when the control light 21 intermittently turns on and off at the frequency of 50 Hz (i.e., with a period of 20 milliseconds), the intensity of the straight-traveling light and the optical-path-changed light is identical to the intensity of the signal light in the reference state where the control light is continuously turned on or off. Therefore, the amplitude is equal to 1.0.

The intensity of the straight-traveling light and the optical-path-changed light changes from 0.0 to 1.0, or vice versa, according to the turning on and off of the control light, during a half of the period (i.e., 10 milliseconds).

More specifically, a half (½) of a reciprocal of the frequency; i.e., a half of the period, can be referred to as "response time" in the signal light optical-path-switching operation that corresponds to the turning on and off of the control light. When the optical system is adjusted, the response time of either the straight-traveling light or the optical-path-changed light tends to become faster.

According to the example illustrated in FIG. 9, the optical-path-changed light reaches the amplitude level of 1.0 faster than does the straight-traveling light. For the signal light, the response time required to reach the amplitude level of 1.0 is approximately 5 milliseconds in the case of the straight-traveling light and 2.5 milliseconds in the case of the optical-path-changed light.

The response time of an ordinary electric switch is equal to a time required to reach a signal intensity level of $1/\sqrt{2}$; i.e., an amplitude level of 0.707. In the example illustrated in FIG. 9, if it is defined that an optical-path-switching time is equal to a response time required to reach an amplitude level of approximately 0.7, the optical-path-switching time is approximately 2.5 milliseconds in the case of the straight-traveling light and approximately 0.9 milliseconds in the case of the optical-path-switched light.

[Integration of Component Techniques] Overall Performance as the Optical-Path-Switching Apparatus:

In the above-described embodiment, adjustment of the optical system is performed in such a way as to optimize the response time in an optical-path-switching operation. In addition to the response speed, the crosstalk between channels in a one-to-seven type optical-path-switching operation and the coupling efficiency of the light-receiving-side optical fiber (i.e., insertion loss of the optical-path-switching apparatus) are important optical-path-switching characteristics.

Characteristic values that can be simultaneously attained in the best mode of the present embodiment obtainable by adequately combining the above-described various characteristics are as follows.

Response time in optical-path-switching operation: within 10 milliseconds.

Crosstalk between straight-traveling signal light and six optical-path-switched lights: within −30 dB.

Insertion loss of optical-path-switching apparatus: within 2.5 dB.

Comparative Embodiment 1

As example settings relating to the apparatus and the operation method to be compared with the first embodiment of the present invention, the signal light incidence plane of the thermal-lens-forming optical element 1 is set to be parallel to the direction of gravity and the traveling directions of the signal light and the control light incident on the thermal lens-forming-optical element 1 are set to be perpendicular to the direction of gravity.

The layout of the peripheral optical fibers No. 1 to No. 6 constituting the emission-side end face closely-arranged seven-core optical fiber bundle 100, when rotated 180 degrees, corresponds to the layout of the peripheral optical fibers No. 1 to No. 6 constituting the light-receiving-side seven-core optical fiber bundle. However, in the emission-side end face closely-arranged seven-core optical fiber bundle 100, the peripheral optical fibers No. 1 and No. 2 are positioned on the lower side thereof and the peripheral optical fibers No. 4 and No. 5 are positioned on the upper side thereof. Optical components constituting the apparatus are basically similar to those described in the first embodiment.

Figure 7:
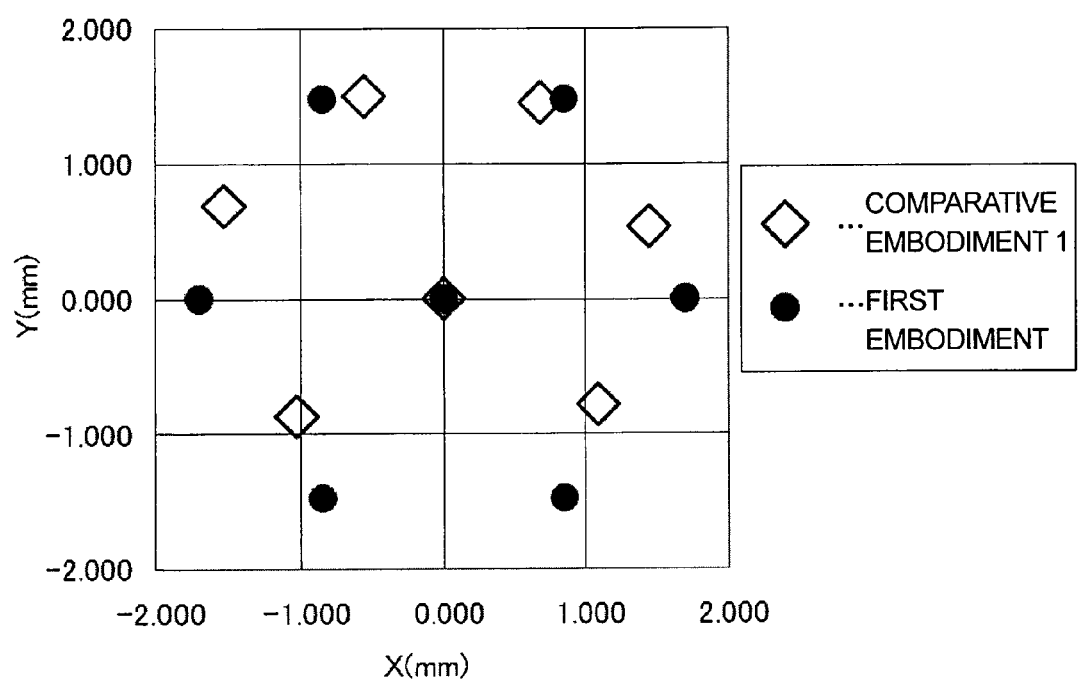
FIG. 7 illustrates beam positions of the straight-traveling signal light and the optical-path-switched signal lights, which can be measured when the control light and the signal light are incident on a light-absorbing layer of a thermal-lens-forming optical element while maintaining a distance of 30 μm between optical axes thereof, and straight-traveling signal light 10 and optical-path-switched signal lights 11 to 16 emitted from the thermal-lens-forming optical element are incident on a light-receiving plane of a beam profiler.

FIG. 7 illustrates beam positions of the straight-traveling signal light and the optical-path-switched signal lights actually measured at the position of the light-receiving lens 7 of the beam profiler (not illustrated), when the straight-traveling signal light 10 and the optical-path-switched signal lights 11 to 16 are emitted from the thermal-lens-forming optical element 1.

In FIG. 7, each black circular mark indicates a beam position actually measured using the system according to the first embodiment and each square mark indicates a beam position actually measured using the system according to comparative embodiment 1. According to comparative embodiment 1, the hexagonal shape connecting the beam positions of the optical-path-changed signal lights is a flat hexagonal shape that is compressed in the up-and-down direction (not a regular hexagonal shape), because the thermal-lens-forming optical element 1 is parallel to the direction of gravity and the traveling direction of the control light is perpendicular to the direction of gravity.

More specifically, a low-density thermal lens area formed in the light-absorbing layer of the thermal-lens-forming optical element 1 "floats (moves upward)" in the solution cell. Therefore, if the signal light is positioned higher than the control light in the thermal lens, the signal light is subjected to greater thermal lens effects. In the above-described Formula (2), $\omega_{in}$ has a negative value and $\omega_{out}$ becomes smaller. As a result, the distance Rout becomes smaller as understood from Formula (1).

On the other hand, if the signal light is positioned lower than the control light in the thermal lens, the signal light is subjected to slightly smaller thermal lens effects. However, the influence is not so remarkably large as compared to the case where the signal light is positioned higher than the control light in the thermal lens. Further, the influence of heat convection is substantial negligible in the "right-and-left" direction of FIG. 7.

Comparative Embodiment 2

As example settings relating to the apparatus and the operation method to be compared with the first embodiment of the present invention, the signal light incidence plane of the thermal-lens-forming optical element 1 is set to be perpendicular to the direction of gravity and the traveling directions of the signal light and the control light incident on the thermal-lens-forming optical element 1 are set to be opposite to the direction of gravity. The remaining features relating to the optical components are similar to those described in the first embodiment.

According to comparative embodiment 2, the thermal lens effects obtained by comparative embodiment 2 are very small compared to the thermal lens effects obtained in the first embodiment. The distance between an image formed by the straight-traveling signal light and an image formed by the optical-path-changed signal light is smaller than that expressed using the black circular marks in FIG. 7.

Further, "fluctuation" with respect to the image-forming position of the optical-path-changed signal light is recognized. The cause of this is believed to be that, if formed beneath the light-absorbing layer of the thermal-lens-forming optical element 1, the low-density thermal lens area rises progressively in the solution having a thickness of 500 μm. As a result, the energy supplied as the control light cannot be effectively used for the thermal lens that changes the optical path of the signal light. Further, it can be estimated that the fluctuation in heat convection gives adverse influence to the optical path change of the signal light.

Second Embodiment

Figure 4:
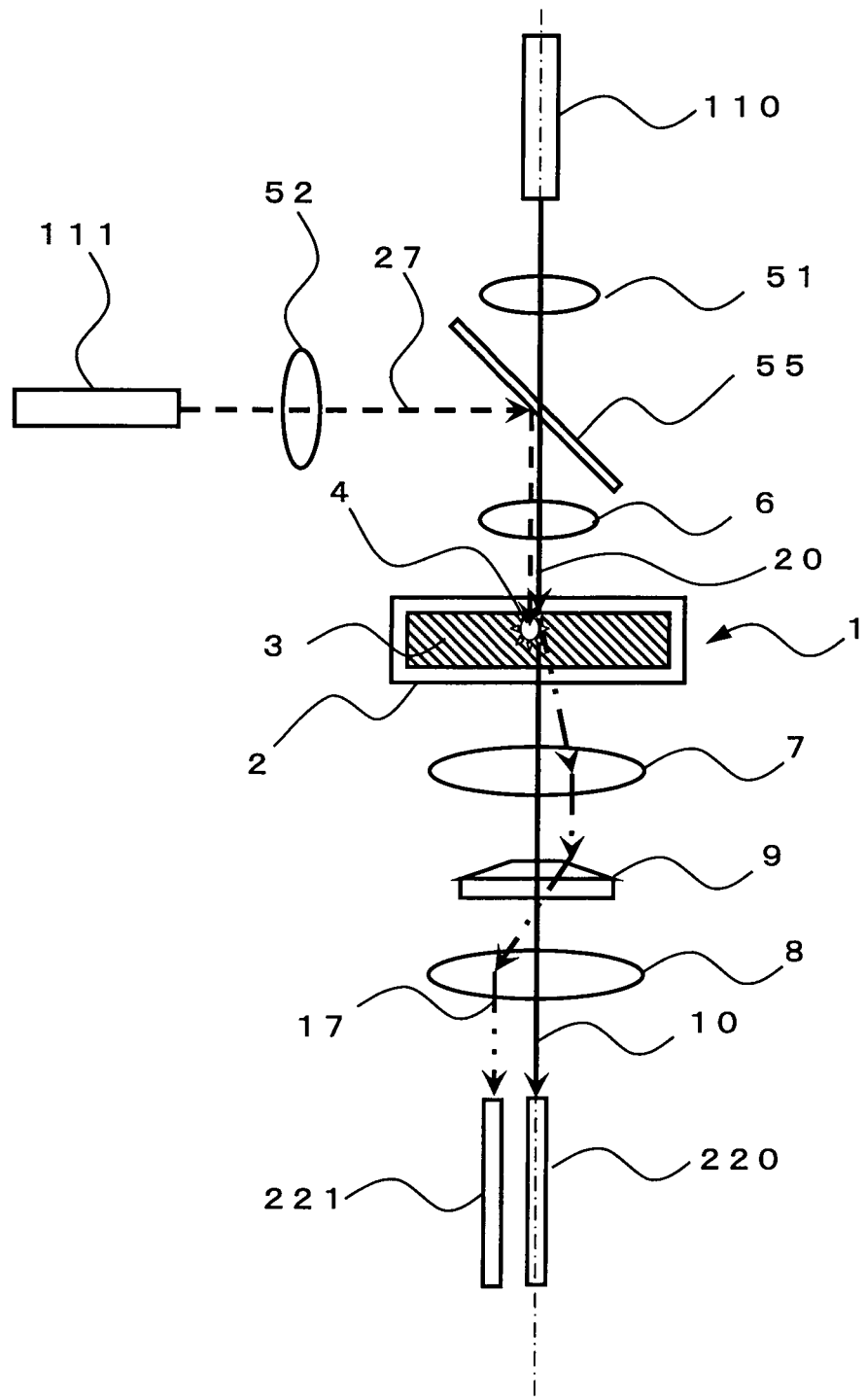
FIG. 4 schematically illustrates an optical-path-switching apparatus according to a second embodiment of the present invention.

FIG. 4 illustrates a schematic configuration of the optical-path-switching apparatus according to a second embodiment of the present invention.

The second embodiment is characterized in that the emission-side end face closely-arranged seven-core optical fiber bundle 100 used in the first embodiment is replaced by a dichromatic mirror 55. The distance between the optical axis of the collimated signal light 20 and the optical axis of collimated control light 27 is set to fall within a range of 20 μm to 25 μm, so that the converged light can enter the light-absorbing layer of the thermal-lens-forming optical element 1.

Further, the second embodiment differs from the first embodiment in that the light-receiving-side seven-core optical fiber bundle 210 is replaced by a straight-traveling signal-light-receiving optical fiber 220 and an optical-path-changed signal light-receiving optical fiber 221. The remaining elements of the optical-path-switching apparatus according to the second embodiment are similar to those described in the first embodiment.

In this respect, the optical-path-switching apparatus according to the second embodiment is a one-to-two type optical-path-switching apparatus that is configured to emit signal light and control light downward along the direction of gravity. The second embodiment can bring effects similar to those described in the first embodiment, although the method for mixing the signal light and the control light (whose optical axes do not coincide with each other) is different.

While the present invention has been described with reference to exemplary embodiments, it is to be understood that the present invention is not limited to the disclosed exemplary embodiments. Further, this application claims priority from Japanese Patent Application No. 2010-083747 filed Mar. 31, 2010, which is hereby incorporated by reference herein in its entirety.

The invention claimed is:

1. An optical-path-switching apparatus comprising:
a signal light source that can generate signal light having one or more types of wavelengths;
two or more control light sources that can generate control light having a specific wavelength different from that of the signal light;
a thermal-lens-forming optical element including a light-absorbing layer that can transmit the signal light and selectively absorb the control light; and
a condensing unit that can guide the control light and the signal light to converge into the light-absorbing layer in such a way as to differentiate respective convergence points in a direction perpendicular to the optical axis, wherein the thermal-lens-forming optical element causes the control light and the signal light to converge into the light-absorbing layer and then diffuse in the traveling direction of the light in such a way as to transiently form a thermal lens due to a temperature increase locally occurring in an area where the control light is absorbed and its peripheral area in the light-absorbing layer, and the thermal lens generates a refractive index distribution in the light-absorbing layer that can change the traveling direction of the signal light so as to realize optical path switching, a first light-receiving unit and a second light-receiving unit are provided, so that straight signal light whose traveling direction has not been changed due to lack of irradiation with the control light and signal light whose optical path has been switched due to irradiation with the control light are converged or condensed by the first light-receiving unit and the second light-receiving unit that are similar to each other, a wedge-type prism is provided between the first light-receiving unit and the second-light receiving unit, wherein the wedge-type prism refracts the straight signal light whose traveling direction has not been changed due to lack of irradiation with the control light and the signal light whose optical path has been switched due to irradiation with the control light while keeping a light separation state, and further at least one of the following conditions (1) to (5) is satisfied:

(1) a signal light incidence plane of the thermal-lens-forming optical element is set to be perpendicular to the direction of gravity, and the traveling directions of the signal light and the control light incident on the thermal-lens-forming optical element are set to be parallel to the direction of gravity, (2) the condensing unit causes the control light and the signal light to condense on the incidence plane of the light-absorbing layer in such a way as to differentiate respective convergence points in the direction perpendicular to the optical axis and constitute a reducing projection optical system, (3) the wedge-type prism has at least one wedge face provided at a portion corresponding to each passing position of the optical-path-switched signal light, (4) the wedge-type prism has at least one wedge face provided at a portion corresponding to each passing position of the optical path switched signal light so as to refract the optical path switched signal light in such a way as to reduce a distance between the optical axis of the optical-path-switched signal light and the optical axis of the straight signal light whose traveling direction has not been changed due to lack of irradiation with the control light, and (5) the thermal-lens-forming optical element is positioned in such a manner that, when the wedge-type prism is not provided, the straight-traveling signal light and the optical-path-switched signal light are converged or condensed to the same position by the first light-receiving unit and the second light-receiving unit.

2. The optical-path-switching apparatus according to claim 1, wherein the signal light and the control light enter the thermal-lens-forming optical element via the incidence plane positioned on an upper side of the thermal-lens-forming optical element.

3. The optical path switching apparatus according to claim 1, further comprising:

an end face closely-arranged multi-core optical fiber bundle that can receive the straight signal light whose traveling direction has not been changed and the signal light whose optical path has been switched, which are converged or condensed by the second light-receiving unit.

4. The optical path switching apparatus according to claim 1, further comprising:

an end face closely-arranged seven-core optical fiber bundle that includes a central optical fiber having a non-bundled terminal connected to the signal light source and six peripheral optical fibers having non-bundled terminal ends respectively connected to two to six control light sources each generating control light having a wavelength different from that of the signal light.

5. The optical-path-switching apparatus according to claim 1, wherein the wedge-type prism is a hexagonal truncated pyramid prism capable of causing the straight signal light whose traveling direction has not been changed due to lack of irradiation with the control light to vertically pass through a top flat face of the hexagonal truncated pyramid prism while causing the signal light whose optical path has been switched to pass through any one of six wedge faces of the hexagonal truncated pyramid prism, thereby causing each light to exit from the hexagonal truncated pyramid prism.

6. The optical-path-switching apparatus according to claim 1, wherein the first light-receiving unit and the second light-receiving unit are spherical or non-spherical convex lenses having a focal length within a range of 1.0 mm to 3.0 mm.

7. A light signal optical-path-switching method, comprising:

causing a signal light source to generate signal light having one or more types of wavelengths;

causing two or more control light sources to generate control light having a specific wavelength different from that of the signal light;

guiding the control light and the signal light to converge into a light-absorbing layer of a thermal-lens-forming optical element capable of transmitting the signal light and selectively absorbing the control light in such a way as to differentiate respective convergence points in a direction perpendicular to the optical axis;

causing the signal light to transmit to the thermal-lens-forming optical element;

causing the control light to be absorbed in the light-absorbing layer of the thermal-lens-forming optical element in such a way as to transiently form a thermal lens due to a temperature increase locally occurring in an area where the control light is absorbed and its peripheral area in the light-absorbing layer, and causing the thermal lens to generate a refractive index distribution in the light-absorbing layer to change the traveling direction of the signal light so as to realize optical path switching;

causing a first light-receiving unit and a second light-receiving unit, which are constituted by the same optical element, to converge or condense straight signal light whose traveling direction has not been changed due to lack of irradiation with the control light and signal light whose optical path has been switched due to irradiation with the control light, and causing a wedge-type prism provided between the first light-receiving unit and the second light-receiving unit to refract the straight signal light whose traveling direction has not been changed due to lack of irradiation with the control light and the signal light whose optical path has been switched due to irradiation with the control light while keeping a light separation state, wherein at least one of the following conditions (6) to (10) is satisfied:

(6) a signal light incidence plane of the thermal-lens-forming optical element is set to be perpendicular to the direction of gravity, and the traveling directions of the signal light and the control light incident on the thermal-lens-forming optical element are set to be parallel to the direction of gravity, (7) the control light and the signal light are condensed on the incidence plane of the light-absorbing layer in such a way as to differentiate respective convergence points in the direction perpendicular to the optical axis and constitute a reducing projection optical system, (8) the wedge-type prism has at least one wedge face provided at a portion corresponding to each passing position of the optical-path-switched signal light, (9) the wedge-type prism has at least one wedge face provided at a portion corresponding to each passing position of the optical-path-switched signal light so as to refract the optical path switched signal light in such a way as to reduce a distance between the optical axis of the optical-path-switched signal light and the optical axis of the straight signal light whose traveling direction has not been changed due to lack of irradiation with the control light, and

(10) the thermal-lens-forming optical element is positioned in such a manner that, when the wedge-type prism is not provided, the straight-traveling signal light and the optical-path-switched signal light are converged or condensed to the same position.

* * * * *

UNITED STATES PATENT AND TRADEMARK OFFICE
CERTIFICATE OF CORRECTION

PATENT NO.         : 8,659,818 B2
APPLICATION NO.    : 13/637582
DATED              : February 25, 2014
INVENTOR(S)        : Ichiro Ueno et al.

It is certified that error appears in the above-identified patent and that said Letters Patent is hereby corrected as shown below:

On the Title Page, Item (73) Assignee, please change "Dainichiseika Color & Chemical" to --Dainichiseika Color & Chemicals Mfg. Co., Ltd.--.

Signed and Sealed this
Second Day of December, 2014

Michelle K. Lee
*Deputy Director of the United States Patent and Trademark Office*